US012256046B2

United States Patent
Haruta

(10) Patent No.: US 12,256,046 B2
(45) Date of Patent: Mar. 18, 2025

(54) CONTROLLING INSPECTION OF PRINTED MATERIAL BASED ON REFERENCE IMAGE AND SCAN IMAGE WITH ALIGNMENT PERFORMED BASED ON THE NUMBER OF FEATURE POINTS IN THE REFERENCE IMAGE

(71) Applicant: CANON KABUSHIKI KAISHA, Tokyo (JP)

(72) Inventor: Kenichirou Haruta, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 18/053,542

(22) Filed: Nov. 8, 2022

(65) Prior Publication Data

US 2023/0142237 A1     May 11, 2023

(30) Foreign Application Priority Data

Nov. 10, 2021    (JP) ................................ 2021-183017

(51) Int. Cl.
*H04N 1/00*        (2006.01)
*G06T 7/33*        (2017.01)

(52) U.S. Cl.
CPC ......... *H04N 1/00068* (2013.01); *G06T 7/337* (2017.01); *H04N 1/00039* (2013.01); *H04N 1/00087* (2013.01); *H04N 1/0044* (2013.01); *H04N 1/00702* (2013.01); *H04N 1/00015* (2013.01); *H04N 1/00045* (2013.01); *H04N 1/00074* (2013.01)

(58) Field of Classification Search
CPC ........... H04N 1/00015; H04N 1/00039; H04N 1/00045; H04N 1/00068; H04N 1/00087; H04N 1/0044; H04N 1/00702; G06T 7/001; G06T 7/33; G06T 7/337; G06T 2207/30144

See application file for complete search history.

(56) References Cited

U.S. PATENT DOCUMENTS 10,657,635 B2 *   5/2020   Kaneko ................... G06T 7/001
11,627,226 B2 *   4/2023   Tashiro ................... G06T 7/001
                                                                358/1.13

(Continued)

FOREIGN PATENT DOCUMENTS

JP         2021135197 A     9/2021

*Primary Examiner* — Scott A Rogers
(74) *Attorney, Agent, or Firm* — Canon U.S.A., Inc. IP Division

(57) ABSTRACT

An inspection system extracts feature points from a scan image and from a reference image, performs alignment of the scan image and the reference image based on the extracted feature points, inspects a printed material using the aligned scan and reference images, and performs processing in accordance with a method selected from among a plurality of methods including at least a first method and a second method in a case where the number of the feature points in the reference image is less than a predetermined number. The processing is performed such that, in the case where the number of the feature points in the reference image is less than the predetermined number, the alignment using at least the extracted feature points is performed when the first method is selected, and the inspection is then carried out, whereas the inspection is not carried out when the second method is selected.

19 Claims, 17 Drawing Sheets

(56) References Cited

U.S. PATENT DOCUMENTS

| | | | |
|---|---|---|---|
| 11,720,298 B2* | 8/2023 | Ito | G06F 3/1208 |
| | | | 358/1.14 |
| 11,838,454 B2* | 12/2023 | Daiku | H04N 1/0066 |
| 11,838,455 B2* | 12/2023 | Ichimi | H04N 1/00082 |
| 11,954,377 B2* | 4/2024 | Ito | G06T 7/001 |
| 12,047,537 B2* | 7/2024 | Muraishi | H04N 1/00037 |
| 12,063,331 B2* | 8/2024 | Ishii | H04N 1/0071 |
| 12,132,871 B2* | 10/2024 | Ishii | G06F 3/1208 |
| 2013/0114102 A1* | 5/2013 | Yamamoto | G06V 10/245 |
| | | | 358/1.14 |
| 2020/0234091 A1* | 7/2020 | Itou | G06T 7/33 |
| 2020/0234456 A1* | 7/2020 | Mita | G06V 10/44 |
| 2021/0274050 A1* | 9/2021 | Morita | H04N 1/0066 |
| 2023/0168851 A1* | 6/2023 | Miyahara | H04N 1/00029 |
| | | | 358/1.15 |
| 2023/0342911 A1* | 10/2023 | Wakui | G06T 7/30 |
| 2023/0377130 A1* | 11/2023 | Muraishi | H04N 1/00047 |
| 2024/0015251 A1* | 1/2024 | Ichihashi | G06T 7/13 |
| 2024/0029238 A1* | 1/2024 | Daiku | G06T 7/11 |
| 2024/0037891 A1* | 2/2024 | Kazumi | G06T 3/02 |
| 2024/0119583 A1* | 4/2024 | Daiku | G06T 7/337 |
| 2024/0179247 A1* | 5/2024 | Miyajima | H04N 1/6047 |

* cited by examiner

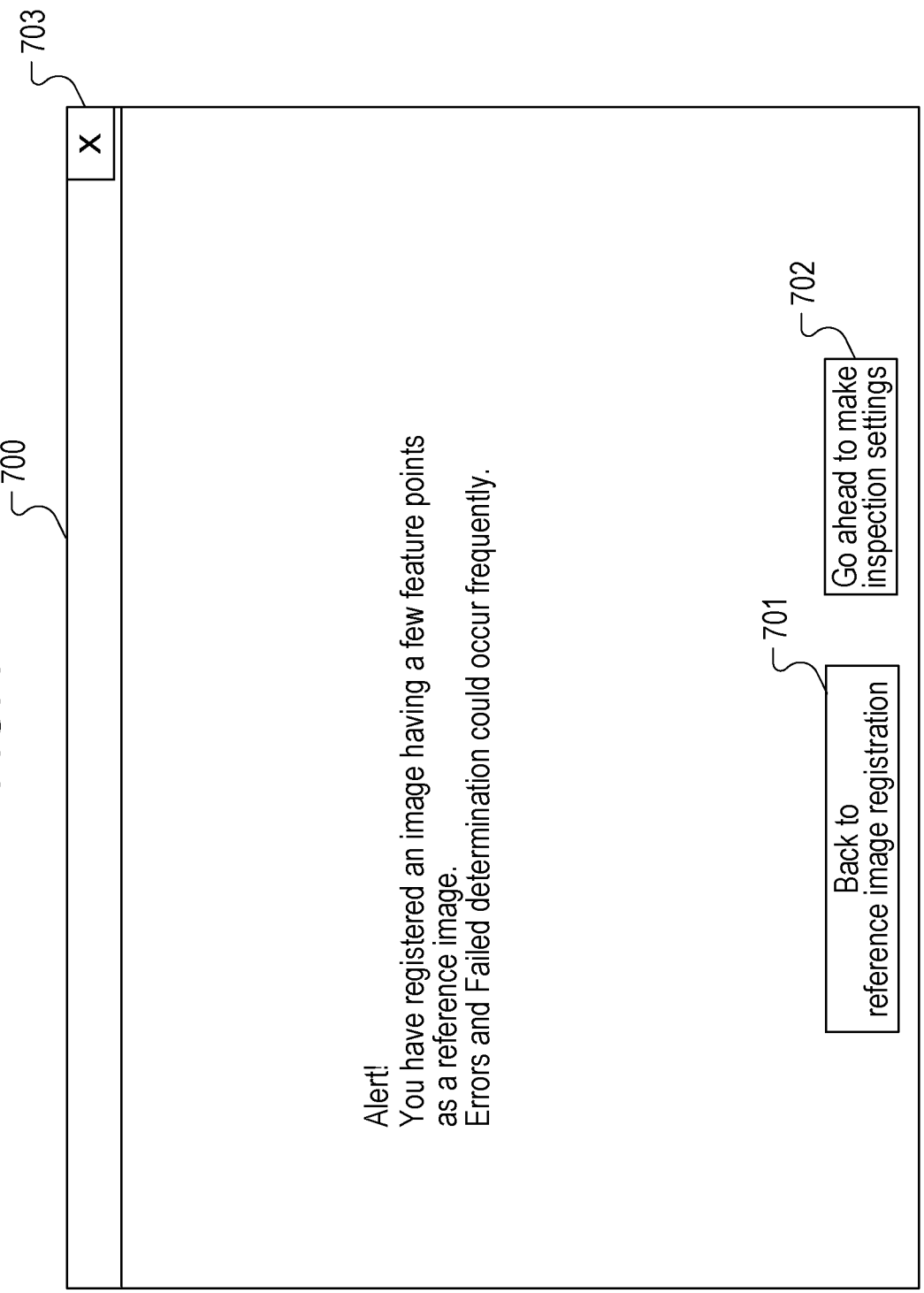

FIG. 14A

|  | START COORDINATE | END COORDINATE | INSPECTION LEVEL (SPOT) | INSPECTION LEVEL (STREAK) |
|---|---|---|---|---|
| AREA OF FOCUS | A1, B1 | A2, B2 | LEVEL 7 | LEVEL 7 |
| STANDARD INSPECTION AREA | C1, D1 | C2, D2 | LEVEL 6 | LEVEL 6 |
| SIMPLE INSPECTION AREA | E1, F1 | E2, F2 | LEVEL 5 | LEVEL 5 |
| OUT-OF-THE-SCOPE-OF-INSPECTION AREA | G1, H1 | G2, H2 | N/A | N/A |

FIG. 14B

|  | START COORDINATE | END COORDINATE | INSPECTION LEVEL (SPOT) | INSPECTION LEVEL (STREAK) |
|---|---|---|---|---|
| AREA OF FOCUS | A1, B1 | A2, B2 | LEVEL 1 | LEVEL 1 |
| STANDARD INSPECTION AREA | C1, D1 | C2, D2 | LEVEL 1 | LEVEL 1 |
| SIMPLE INSPECTION AREA | E1, F1 | E2, F2 | LEVEL 1 | LEVEL 1 |
| OUT-OF-THE-SCOPE-OF-INSPECTION AREA | G1, H1 | G2, H2 | N/A | N/A |

FIG. 14C

|  | START COORDINATE | END COORDINATE | INSPECTION LEVEL (SPOT) | INSPECTION LEVEL (STREAK) |
|---|---|---|---|---|
| AREA OF FOCUS | A1, B1 | A2, B2 | LEVEL 7 | LEVEL 7 |
| STANDARD INSPECTION AREA | C1, D1 | C2, D2 | LEVEL 6 | LEVEL 6 |
| SIMPLE INSPECTION AREA | E1, F1 | E2, F2 | LEVEL 5 | LEVEL 5 |
| OUT-OF-THE-SCOPE-OF-INSPECTION AREA | 0, 0 | Xmax, Ymax | N/A | N/A |

CONTROLLING INSPECTION OF PRINTED MATERIAL BASED ON REFERENCE IMAGE AND SCAN IMAGE WITH ALIGNMENT PERFORMED BASED ON THE NUMBER OF FEATURE POINTS IN THE REFERENCE IMAGE

BACKGROUND

Field of the Disclosure

The present disclosure relates to an inspection system, a method for controlling inspection system.

Description of the Related Art

A printing system including a printing apparatus and an inspection apparatus and configured to inspect a sheet printed by the printing apparatus by the inspection apparatus during sheet conveyance has recently been known. When inspecting a printed sheet, the inspection apparatus scans an image of the printed sheet that is conveyed thereto, and then performs image analysis on the scanned image to determine whether the printed sheet is OK or not.

To generate a reference image to be used for image analysis, in a method according to related art, an inspection apparatus scans a sheet having been printed in advance and being in sufficient print quality, and uses the scanning result as the reference image.

Japanese Patent Laid-open No. 2021-135197 discloses an inspection apparatus configured to, when comparing a print image obtained by scanning a conveyed printed sheet with a reference image for inspection, perform image-to-image alignment based on feature points extracted from each of these two images.

SUMMARY

In a case where a sufficient number of feature points for the image-to-image alignment fail to be extracted, an inspection apparatus disclosed in this publication uses information on sheet vertices of the print image to carry out the inspection. An inspection system according to a certain aspect of the present disclosure includes: one or more controllers having one or more processors and one or more memories, the one or more controllers being configured to: scan a printed material including a printed image to generate a scan image, extract one or more feature points from each of the scan image and a reference image, perform alignment of the scan image and the reference image based on at least one or more corresponding pair among the feature points extracted from the scan image and from the reference image having been registered in advance; carry out inspection of the printed material by using the reference image having been subjected to the alignment and the scan image having been subjected to the alignment, and perform processing in accordance with a method selected from among a plurality of methods including at least a first method and a second method in a case where a number of the feature points in the reference image is less than a predetermined number, wherein the processing is performed such that, in the case where the number of the feature points in the reference image is less than the predetermined number, the alignment using at least the extracted feature points is performed when the first method is selected, and the inspection is then carried out, whereas the inspection is not carried out when the second method is selected.

Further features of the present disclosure will become apparent from the following description of exemplary embodiments with reference to the attached drawings.

BRIEF DESCRIPTION OF THE DRAWINGS

FIG. 7 is a diagram illustrating an example of a UI screen for alerting the user.

FIG. 14A is a diagram illustrating an example of inspection level coordinate information.

FIG. 14B is a diagram illustrating an example of inspection level coordinate information.

FIG. 14C is a diagram illustrating an example of inspection level coordinate information.

DESCRIPTION OF THE EMBODIMENTS

With reference to the accompanying drawings, the best mode for implementation of the disclosed technique will now be explained in detail.

In the description below, an external controller may be referred to as an image processing controller, a digital front end (DFE), a print server, or the like. An image forming apparatus may be hereinafter referred to as a multifunction printer, a multifunction peripheral (MFP), or the like.

Figure 1:
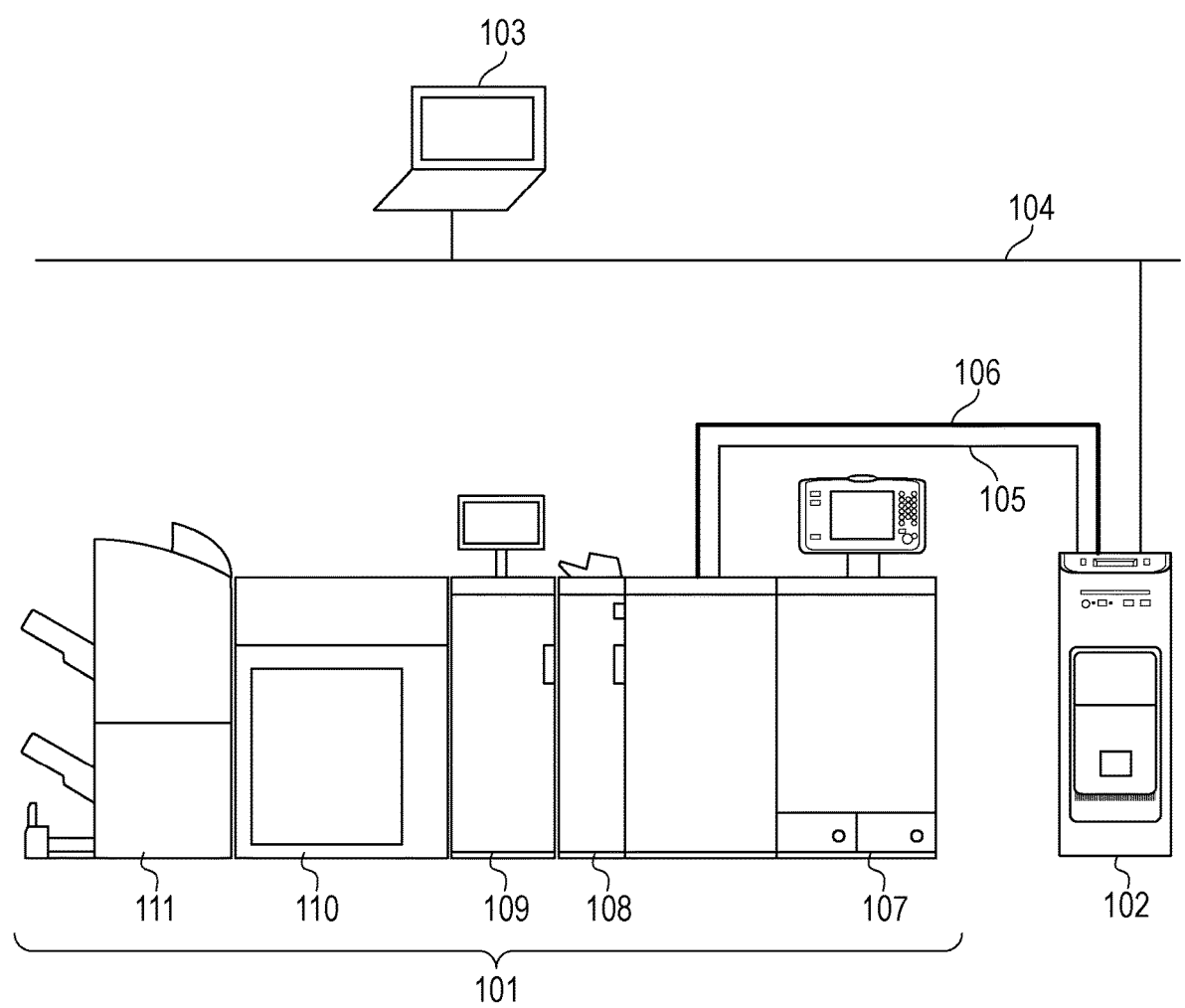
FIG. 1 is an example of an overall view of a printing system.

FIG. 1 is an overall view of a hardware configuration of an image processing system according to the present embodiment. The image processing system includes an image forming apparatus 101 and an external controller 102. The image forming apparatus 101 and the external controller 102 are connected to each other via an internal LAN 105 and a video cable 106 such that communication can be performed therebetween. The video cable 106, instead of having its hardware configuration, may be configured such that its function is fulfilled by the internal LAN 105. The external controller 102 is connected to a client PC 103 via an external LAN 104 such that communication can be performed therebetween. Print instructions are given from the PC 103 to the external controller 102.

A printer driver having a function of converting print data into a print description language that can be processed by the external controller 102 is installed in the client PC 103. A user who wants printing to be executed is able to give print instructions from various kinds of application via the printer driver. Based on the print instructions given by the user, the printer driver transmits the print data to the external controller 102. Upon receiving the print instructions from the PC 103, the external controller 102 performs data analysis processing and rasterization processing, and inputs the print data into the image forming apparatus 101 for execution of the print instructions.

Next, the image forming apparatus 101 will now be explained. In the image forming apparatus 101, a plurality of apparatuses having different functions are connected. The image forming apparatus 101 is capable of performing complex print processing such as bookbinding.

A printing apparatus 107 forms an image using toners on a recording sheet (paper) conveyed from a sheet feeding unit provided near the bottom of the printing apparatus 107. The configuration of the printing apparatus 107, and its operation principle, is as follows. A ray of light such as a laser beam modulated according to image data is reflected by a rotating polygon mirror or the like. The reflected light impinges on a photosensitive drum as scanning light. An electrostatic latent image formed on the photosensitive drum by the laser beam is developed using a toner. The toner image is transferred onto a recording sheet clinging to a transfer drum. A series of image forming processes described above is executed sequentially for a yellow toner (Y), a magenta toner (M), a cyan toner (C), and a black toner (K), thereby forming a full-color image on the sheet. The sheet with the full-color image is conveyed from the transfer drum to a fixing device. The fixing device includes rollers, a belt, and the like. A heating source such as a halogen heater is built in a roller of the fixing device. Heat and pressure are applied to the sheet onto which the toner image has been transferred, thereby melting the toners and making the toners fixed to the sheet.

The reference numeral 108 denotes an inserter for inserting an insertion sheet. A sheet can be inserted from the inserter 108 at a desired position between printed sheets conveyed from the printing apparatus 107.

An inspection apparatus 109 is an apparatus that scans an image of the conveyed sheet and compares the scanned image with a reference image that has been registered in advance, thereby determining whether the printed image is OK or not.

The reference numeral 110 denotes a large-capacity stacker having a large sheet accommodation capacity. The reference numeral 111 denotes a finisher that performs finish processing on sheets conveyed thereto. The finisher 111 is capable of performing stapling, punching, saddle stitching, or the like. The finish-processed sheets are ejected onto an ejection tray.

In the printing system described with reference to FIG. 1, the external controller 102 is connected to the image forming apparatus 101. However, the scope of the present disclosure is not limited to a configuration with the external controller 102 connected thereto.

That is, the image forming apparatus 101 may be connected to the external LAN 104, and print data that can be processed by the image forming apparatus 101 may be transmitted from the client PC 103. In this case, data analysis processing and rasterization processing are performed in the image forming apparatus 101. Then, print processing is performed.

Figure 2:
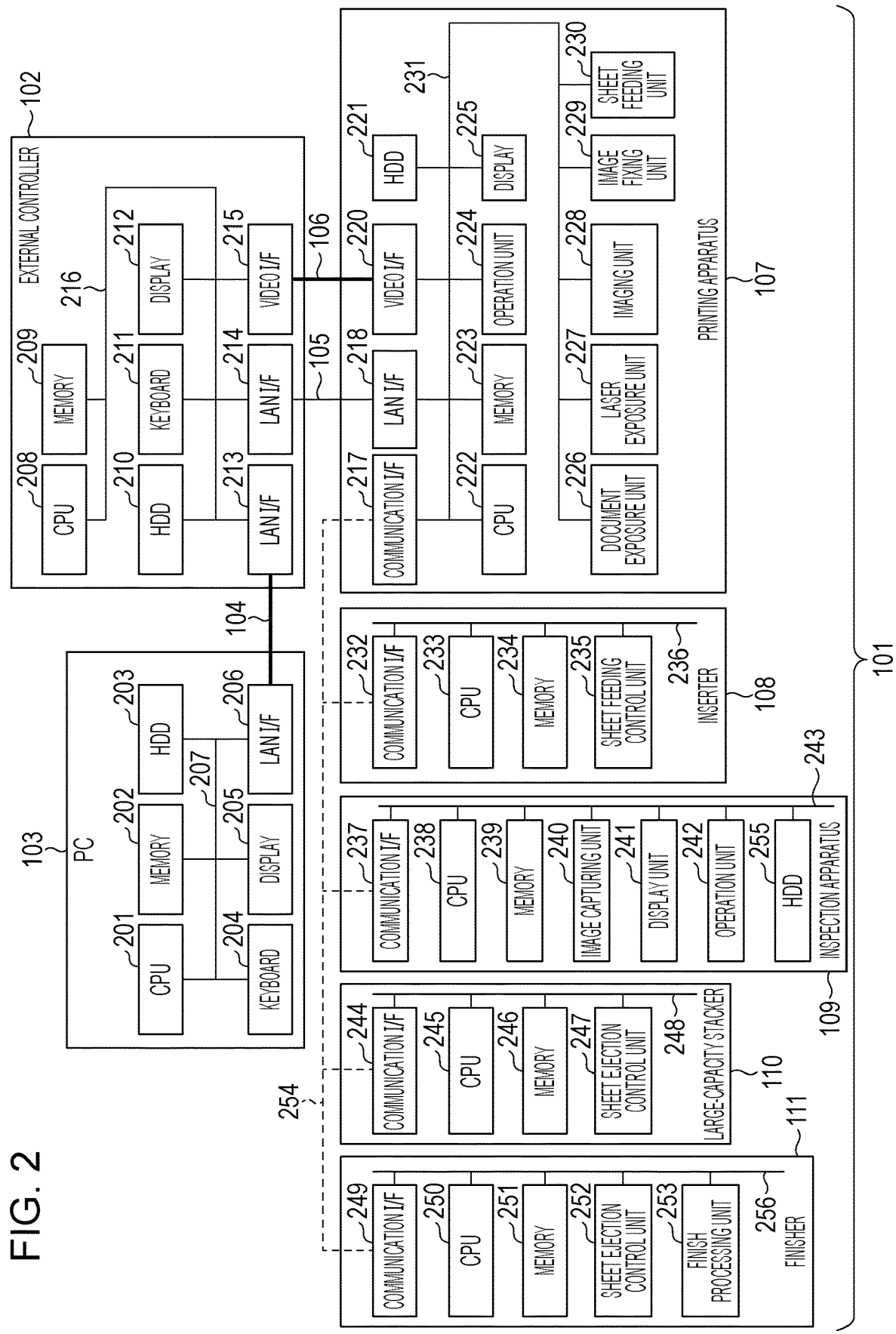
FIG. 2 is an example of a block diagram illustrating a system configuration of the printing system.

FIG. 2 is a block diagram illustrating a system configuration of the image forming apparatus 101, the external controller 102, and the client PC 103.

First, the configuration of the printing apparatus 107 of the image forming apparatus 101 will now be explained. The printing apparatus 107 of the image forming apparatus 101 includes a communication I/F 217, a LAN I/F 218, a video I/F 220, an HDD 221, a CPU 222, a memory 223, an operation unit 224, and a display 225. The printing apparatus 107 of the image forming apparatus 101 further includes a document exposure unit 226, a laser exposure unit 227, an imaging unit 228, a fixing unit 229, and a sheet feeding unit 230. These components are interconnected via a system bus 231.

The communication I/F 217 is connected via a communication cable 254 to the inserter 108, the inspection apparatus 109, the large-capacity stacker 110, and the finisher 111. Communication for control of each of these apparatuses is performed via the communication I/F 217.

The LAN I/F 218 is connected via the internal LAN 105 to the external controller 102. Communication of print data, etc., is performed via the LAN I/F 218.

The video I/F 220 is connected via the video cable 106 to the external controller 102. Communication of image data, etc., is performed via the video I/F 220.

The HDD 221 is a storage device in which programs and data are stored. Based on the programs, etc. stored in the HDD 221, the CPU 222 performs image processing control and print control comprehensively. Programs needed for the CPU 222 to perform various kinds of processing, and image data, are stored in the memory 223. The memory 223 behaves as a work area. The operation unit 224 receives inputs for various kinds of setting and operation instructions from a user. Setting information of the image processing apparatus, print job processing status, and the like are displayed on the display 225. The document exposure unit 226 performs document reading processing when a copy function or a scan function is used. While applying the light of its exposure lamp to the sheet placed by the user, the document exposure unit 226 captures an image by means of its CMOS image sensor to obtain document data. The laser exposure unit 227 is a device that performs primary charging for irradiating the photosensitive drum with a laser beam for toner-image transfer and performs laser exposure. In the laser exposure unit 227, first, primary charging for charging the surface of the photosensitive drum to a uniform negative potential is performed. Next, a laser beam is applied to the photosensitive drum by means of a laser driver while adjusting a reflection angle by means of a polygon mirror. This neutralizes the negative electric charge at the irradiated portion, thereby forming an electrostatic latent image. The imaging unit 228 is a device for toner transfer to a sheet. The imaging unit 228 includes a development unit, a transfer unit, a toner replenishment unit, etc. The imaging unit 228 transfers the toner on the photosensitive drum onto the sheet. In the development unit, the toner charged to negative polarity is applied from its development cylinder to the electrostatic latent image on the surface of the photosensitive drum so as to visualize the image. In the transfer unit, primary transfer and secondary transfer are performed. The primary transfer is operation of transferring the toner on the surface of the photosensitive drum onto a transfer belt by applying a positive potential to a primary transfer roller. The secondary transfer is operation of transferring the toner on the transfer belt onto a sheet by applying a positive potential to a secondary transfer outer roller. The fixing unit 229 is a device for melting the toner on the sheet by applying heat and pressure thereto for fixing it. The fixing unit 229 includes a heater, a fixing belt, a pressing belt, etc. The sheet feeding unit 230 is a device for feeding a sheet. Its sheet-feeding/conveying operation is controlled using rollers and various sensors.

Next, the configuration of the inserter 108 of the image forming apparatus 101 will now be explained. The inserter 108 of the image forming apparatus 101 includes a communication I/F 232, a CPU 233, a memory 234, and a sheet feeding control unit 235. These components are interconnected via a system bus 236. The communication I/F 232 is connected via the communication cable 254 to the printing apparatus 107. Communication needed for control is performed via the communication I/F 232. In accordance with control programs stored in the memory 234, the CPU 233 performs various kinds of control needed for sheet feeding. The memory 234 is a storage device in which the control programs are stored. Based on instructions from the CPU 233, the sheet feeding control unit 235 controls the feeding and conveyance of the sheet fed from the sheet feeding unit of the inserter and conveyed from the printing apparatus 107 while controlling rollers and sensors.

Next, the configuration of the inspection apparatus 109 of the image forming apparatus 101 will now be explained. The inspection apparatus 109 of the image forming apparatus 101 includes a communication I/F 237, a CPU 238, a memory 239, an image capturing unit 240, a display unit 241, an operation unit 242, and an HDD 255. These components are interconnected via a system bus 243. The communication I/F 237 is connected via the communication cable 254 to the printing apparatus 107. Communication needed for control is performed via the communication I/F 237. In accordance with control programs stored in the memory 239, the CPU 238 performs various kinds of control needed for inspection. The memory 239 is a storage device in which the control programs are stored. Based on instructions from the CPU 238, the image capturing unit 240 captures an image of a conveyed sheet. The CPU 238 stores, as a reference image, an image captured by the image capturing unit 240 into the memory 239. Specifically, an average of a plurality of scan images is stored as the reference image. In addition, the CPU 238 compares the image captured by the image capturing unit 240 with the reference image stored in the memory 239 to determine whether the printed image is OK or not. The result of inspection, a setting screen, etc. are displayed on the display unit 241. The operation unit 242 is operated by users and receives an instruction for changing the settings of the inspection apparatus 109, an instruction for registering a reference image, and the like. The HDD 255 stores various kinds of setting information and images that are needed for inspection. The various kinds of setting information and images that are stored can be reused.

Next, the configuration of the large-capacity stacker 110 of the image forming apparatus 101 will now be explained. The large-capacity stacker 110 of the image forming apparatus 101 includes a communication I/F 244, a CPU 245, a memory 246, and a sheet ejection control unit 247. These components are interconnected via a system bus 248. The communication I/F 244 is connected via the communication cable 254 to the printing apparatus 107. Communication needed for control is performed via the communication I/F 244. In accordance with control programs stored in the memory 246, the CPU 245 performs various kinds of control needed for sheet ejection. The memory 246 is a storage device in which the control programs are stored. Based on instructions from the CPU 245, the sheet ejection control unit 247 controls the conveyance of the sheet having been conveyed thereto to a stack tray, an escape tray, or the finisher 111 connected downstream of the large-capacity stacker 110.

Next, the configuration of the finisher 111 of the image forming apparatus 101 will now be explained. The finisher 111 of the image forming apparatus 101 includes a communication I/F 249, a CPU 250, a memory 251, a sheet ejection control unit 252, and a finish processing unit 253. These components are interconnected via a system bus 256. The communication I/F 249 is connected via the communication cable 254 to the printing apparatus 107. Communication needed for control is performed via the communication I/F 249. In accordance with control programs stored in the memory 251, the CPU 250 performs various kinds of control needed for finishing and sheet ejection. The memory 251 is a storage device in which the control programs are stored. Based on instructions from the CPU 251, the sheet ejection control unit 252 controls sheet conveyance and sheet ejection. Based on instructions from the CPU 251, the finish processing unit 253 controls finish processing such as stapling, punching, saddle stitching, etc.

Next, the configuration of the external controller 102 will now be explained. The external controller 102 includes a CPU 208, a memory 209, an HDD 210, a keyboard 211, a display 212, a LAN I/F 213, a LAN I/F 214, and a video I/F 215. These components are interconnected via a system bus 216.

Based on programs and data stored in the HDD 210, the CPU 208 performs reception of print data from the client PC 103 and raster image processor (RIP) processing comprehensively. In addition, the CPU 208 performs other processing such as transmission of the print data to the image forming apparatus 101. The CPU 208 is also capable of performing RIP processing for reference image data. Specifically, in RIP processing for reference image data, for example, an image is generated while converting a resolution from 600 dpi to 300 dpi, whereas, in RIP processing for print data, an image is generated without such a resolution reduction.

Programs and data needed for the CPU 208 to perform various kinds of processing are stored in the memory 209. The memory 209 behaves as a work area. Programs and data needed for operation such as print processing are stored in the HDD 210. The keyboard 211 is a device for inputting operational instructions to the external controller 102. Information on applications, etc. run on the external controller 102 is displayed on the display 212 by means of still-image and moving-image video signals. The LAN I/F 213 is connected via the external LAN 104 to the client PC 103. Communication of print instructions etc., is performed via the LAN I/F 213. The LAN I/F 214 is connected via the internal LAN 105 to the image forming apparatus 101. Communication of print instructions etc., is performed via the LAN I/F 214. The external controller 102 is able to interactively exchange various kinds of data with the printing apparatus 107, the inserter 108, the inspection apparatus 109, the large-capacity stacker 110, and the finisher 111 via the internal LAN 105 and the communication cable 254.

The video I/F 215 is connected via the video cable 106 to the image forming apparatus 101. Communication of print data, etc., is performed via the video I/F 215.

Next, the configuration of the client PC 103 will now be explained. The client PC 103 includes a CPU 201, a memory 202, an HDD 203, a keyboard 204, a display 205, and a LAN I/F 206. These components are interconnected via a system bus 207. Based on a document processing program, etc. stored in the HDD 203, the CPU 201 generates print data and gives print instructions. In addition, the CPU 201 controls each device connected to the system bus comprehensively. Programs and data needed for the CPU 201 to perform various kinds of processing are stored in the memory 202. The memory 202 behaves as a work area. Programs and data needed for operation such as print processing are stored in the HDD 203. The keyboard 204 is a device for inputting operational instructions to the PC 103. Information on applications, etc. run on the client PC 103 is displayed on the display 205 by means of still-image and moving-image video signals. The LAN I/F 206 is connected to the external LAN 104. Communication of print instructions etc., is performed via the LAN I/F 206.

In the foregoing description, the internal LAN 105 and the video cable 106 are connected to the image forming apparatus 101 and the external controller 102. However, any alternative configuration may be adopted as long as data needed for printing can be transmitted and received. For example, a "video-cable-only" connection configuration may be adopted. Any storage device configured to store data and programs suffices for each of the memories 202, 209, 223, 234, 239, 246, and 251. For example, the disclosed memory may be replaced with a volatile RAM, a nonvolatile ROM, a built-in HDD, an external HDD, a USB memory, or the like.

Figure 3:
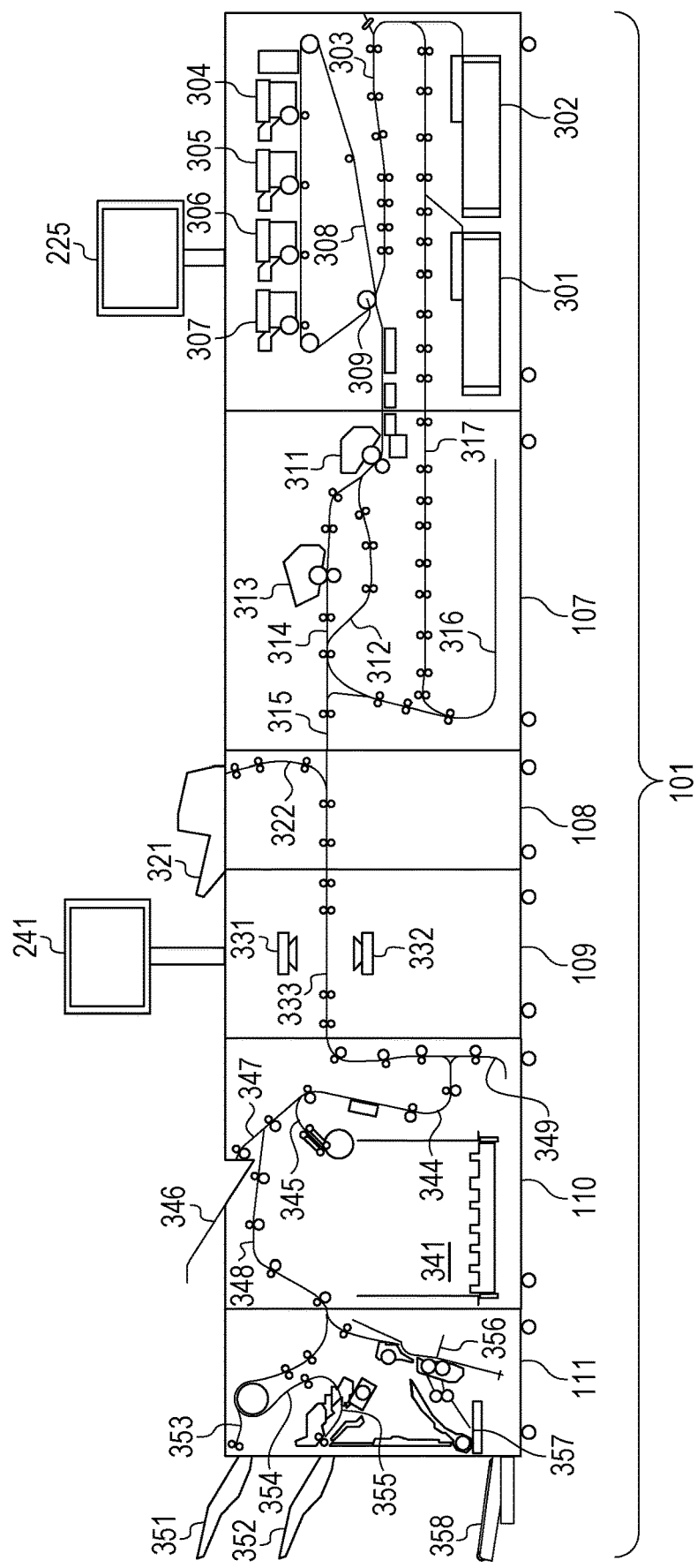
FIG. 3 is an example of a schematic mechanical sectional view of an image forming apparatus.

FIG. 3 is a mechanical sectional view of the image forming apparatus 101. The reference numeral 107 denotes a printing apparatus that forms an image to be printed on a sheet. The reference numerals 301 and 302 denote sheet feeding decks. Each of these sheet feeding decks is able to contain various kinds of sheet. Each of these sheet feeding decks is able to separate the uppermost one of a stack of sheets contained therein and to convey this top sheet to a sheet conveyance path 303. The reference numerals 304 to 307 denote development stations. For color image production, they use respective color-component toners of C, M, Y, and K to form a toner image. The toner image formed here is primarily transferred to an intermediate transfer belt 308. The intermediate transfer belt 308 turns clockwise in the figure. The toner image is transferred at a secondary transfer position 309 to a sheet coming from the sheet conveyance path 303. The display 225 displays information on print status and information for the settings of the image forming apparatus 101. The reference numeral 311 denotes a fixing unit for fixing a toner image to a sheet. The fixing unit 311 includes a pressing roller and a heating roller. The passing of the sheet through the nip of these rollers causes the melting of the toner and the press-fixing thereof, thereby fixing the toner image to the sheet. The sheet having been processed by the fixing unit 311 is conveyed to a sheet conveyance path 315 through a sheet conveyance path 312. Depending on the type of the sheet, if further melting and press-fixing are needed for fixing the toner image, after passing through the fixing unit 311, the sheet is conveyed to a second fixing unit 313 by using an upper sheet conveyance path, and after additional melting and press-fixing, the sheet is conveyed to the sheet conveyance path 315 through a sheet conveyance path 314. If the image forming mode is a duplex mode, the sheet is conveyed to a sheet turnover path 316. After being turned over thereat, the sheet is conveyed to a duplex conveyance path 317, and image transfer to the second side of the sheet is performed at the secondary transfer position 309.

The reference numeral 108 denotes an inserter for inserting an insertion sheet. The inserter 108 includes an inserter tray 321, and causes a sheet fed through a sheet conveyance path 322 to enter a conveyance path. In this way, it is possible to insert a sheet at a desired position into a set of sheets conveyed from the printing apparatus 107.

The sheet having passed through the inserter 108 is conveyed to the inspection apparatus 109. Contact image sensors (CIS) 331 and 332 are disposed inside the inspection apparatus 109 such that they face each other. The CIS 331 is a sensor configured to scan the upper side of a sheet. The CIS 332 is a sensor configured to scan the lower side of the sheet. The image sensors for scanning may be line scan sensors instead of CISs. The inspection apparatus 109 is capable of scanning an image of the sheet by using the CISs 331 and 332 at the timing of arrival of the sheet conveyed along a sheet conveyance path 333 to a predetermined position, and determining whether the image in the apparatus is OK or not. The result of inspection conducted by the inspection apparatus 109, etc. can be displayed on the display unit 241.

The reference numeral 110 denotes a large-capacity stacker having a large sheet accommodation capacity. The large-capacity stacker 110 includes a stack tray 341 on which sheets can be stacked. The sheet having passed through the inspection apparatus 109 comes into the large-capacity stacker 110 through a sheet conveyance path 344. The sheet conveyed from the sheet conveyance path 344 goes through a sheet conveyance path 345 to be outputted onto a stack of sheets on the stack tray 341. The large-capacity stacker 110 includes an escape tray 346 as its ejection tray. The escape tray 346 is an ejection tray used for ejection of a sheet determined as being defective by the inspection apparatus 109. The sheet to be outputted to the escape tray 346 is conveyed from the sheet conveyance path 344 via a sheet conveyance path 347 to the escape tray 346. The sheet is conveyed via a sheet conveyance path 348 when outputted to the post-processing apparatus provided downstream of the large-capacity stacker 110. The reference numeral 349 denotes a turnover portion for turning over the sheet. The turnover portion 349 is used when the sheet is to be outputted onto the stack on the stack tray 341. When the sheet is to be outputted onto the stack on the stack tray 341 such that sheet orientation at the time of output will be the same as sheet orientation at the time of input, the sheet is turned over at the turnover portion 349 once. When the sheet is conveyed to the escape tray 346 or the downstream post-processing apparatus, turnover operation at the turnover portion 349 is not performed because the sheet is ejected directly without flipping when stacked.

The reference numeral 111 denotes a finisher that applies finish processing corresponding to the function designated by the user to sheets conveyed thereto. Specifically, the finisher 111 has a finishing function such as a stapling function (single stapling, double stapling), punching (two holes, three holes), saddle stitching, or the like. The finisher 111 has two ejection trays 351 and 352. The sheet is outputted to the ejection tray 351 via a sheet conveyance path 353. However, finish processing such as stapling cannot be performed on the sheet conveyance path 353. The sheet is conveyed via a sheet conveyance path 354 when finish processing such as stapling is to be performed. The finishing function designated by the user is executed at a processing unit 355. The finish-processed sheets are outputted to the ejection tray 352. Each of the ejection trays 351 and 352 can move up and down. The sheets having been finish-processed at the processing unit 355 can also be ejected onto the ejection tray 351 after the ejection tray 351 is lowered. When saddle stitching is commanded, sheets are stapled together at the center at a saddle stitching processing unit 356. After the stapling, the sheets are folded in half and are then outputted to a saddle stitching tray 358 via a sheet conveyance path 357. The saddle stitching tray 358 has a belt-conveyor configuration. The bundle of the saddle-stitched sheets on the saddle stitching tray 358 is conveyed leftward.

In accordance with preset inspection items, the inspection apparatus 109 inspects an incoming sheet image. Sheet image inspection is carried out by comparing an incoming sheet image with a preset reference image. Some examples of a method for image comparison are: a method of comparing pixel values at each image position, a method of comparing object positions by edge detection, a method of extracting character data by optical character recognition (OCR), and the like. Some examples of inspection items are: precision error in print position, shades of color of an image, image density, streaking and fading, missing print dots, and the like.

Overall Flow of Inspection Processing

Next, with reference to the flowchart of FIG. 4, an overall flow from tasks performed before a start of inspection at the inspection apparatus 109 to execution of the inspection will now be explained. Steps S401 to S412 in the flowchart are implemented by reading and running a program stored in the HDD 255 by the CPU 238.

Figure 4:
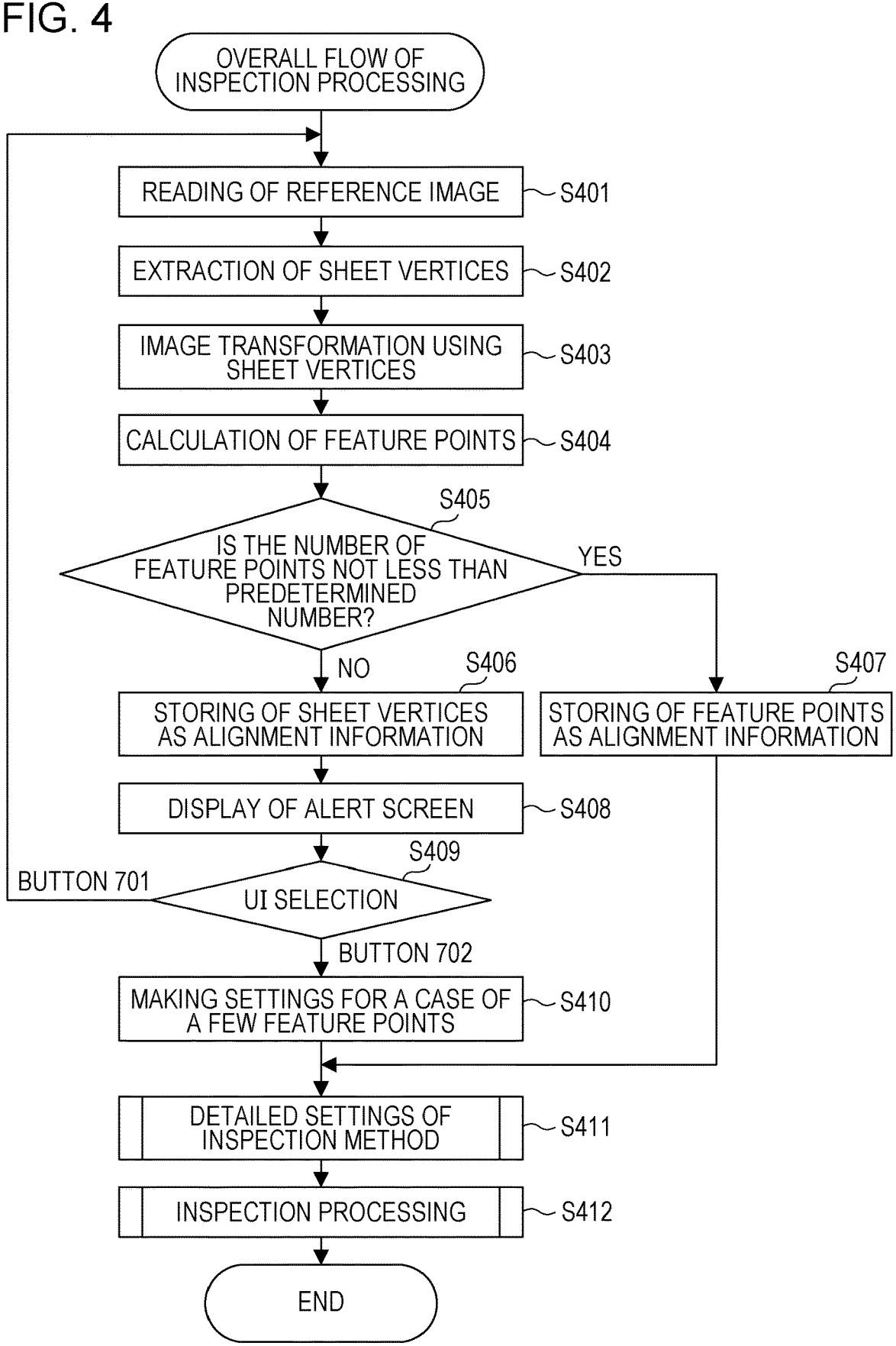
FIG. 4 is an example of a flowchart illustrating an overall flow of inspection processing.

Each processing in FIG. 4 is performed by the inspection apparatus 109 in accordance with user operation via the client PC 103.

First, in the step S401, the inspection apparatus 109 registers a reference image to be used as a reference for inspection OK determination.

There are two methods for generating a reference image. One of the two methods is to generate a reference image by executing a print job and scanning a print image by the image capturing unit 240.

The inspection apparatus 109 waits in a reference image reading mode, and executes a print job for reference image registration commanded from the client PC 103. Upon execution of printing, the inspection apparatus 109 detects the conveyance of a sheet, and scans the sheet by the image capturing unit 240. The image obtained by scanning is stored as the reference image into the memory 239 of the inspection apparatus 109.

The other method is to use, as a reference image, image data after RIP processing, which is generated through analysis of a print job, instead of using a scan image. In the description of the step S402 and the subsequent steps below, a method of generating a reference image by executing a print job and scanning a print image by the image capturing unit 240 is assumed. The steps S402 and S403 are skipped if image data after RIP processing is used as a reference image.

In the step S402, the inspection apparatus 109 extracts the positions of sheet vertices from the image captured by the image capturing unit 240. In the present embodiment, the term "sheet vertices" means the four corners of the sheet of paper.

In the step S403, based on the positions of the sheet vertices obtained in the step S402, the inspection apparatus 109 transforms the image into the shape of the sheet. This process may include processing of converting the resolution of the captured image into predetermined resolution. It is quite common that, in a captured image, an image portion corresponding to a sheet has a deformed shape due to the effect of a sheet skew and/or variations in the speed of conveyance. For example, in a case where the size of a sheet to be inspected is LTR size, where resolution in a main-scanning direction is 300 dpi, and where resolution in a sub-scanning direction is 300 dpi, the shape of the sheet described above will be as follows: a rectangle having a length WR in the main-scanning direction=11 inches×300=3,300 pixels and a length HR in the sub-scanning direction=8.5 inches×300=2,550 pixels. The shape of the sheet can be expressed in a coordinate system by four points of (0, 0), (3299, 0), (0, 2549), and (3299, 2549). The inspection apparatus 109 transforms the shape of the image data such that the four positions of the sheet vertices obtained from the image will coincide with the preset positions of the four points of the shape of the sheet to be inspected. Such image shape transformation is also called as geometric transform. Known methods such as affine transformation, etc. exist. Through the processing in the steps S402 and S403, it is possible to convert the scanned reference image into the size of the sheet to be inspected.

In the step S404, the inspection apparatus 109 calculates feature points. Feature points represent, in an image, point positions suited for alignment of the image as a whole when compared with a reference image in inspection processing to be described later. As feature points suited for alignment of the image as a whole, points whose corner feature amount in the image is large are conceivable. A corner feature is a feature at a point whose local neighborhood stands in two dominant and different edge directions. A corner feature amount is an amount indicating the strength of this edge feature. Preferably, feature points to be used for alignment of the image as a whole should be scattered away from one another to some degree because there will be significant positional misalignment at positions away from the feature points if located in an unbalanced manner at only a certain part of the image. Therefore, from among points where the corner feature amount mentioned above is large, the inspection apparatus 109 extracts, as feature points, scattered points that are located at distributed positions within the entire area of the image. Extraction of feature points will be described later with reference to FIGS. 5A, 5B, and 5C.

In the step S405, the inspection apparatus 109 determines whether or not the number of the feature points extracted by executing the step S404 is not less than a predetermined number. In the present embodiment, the predetermined number of the feature points means the minimum number of feature points that makes it possible to align the scan image with the reference image by using the feature points. In the present embodiment, the predetermined number of the feature points is assumed to be three, but is not limited thereto. The purpose of this determination is to, if the number of the extracted feature points is less than the predetermined number, determine to the effect that an image having a few feature points has been registered, display an alert screen, and prompt the user to select inspection operation to be performed in a case of a few feature points. In a case where the number of the extracted feature points is determined to be not less than the predetermined number and thus where a sufficient number of feature points for image-to-image alignment has been extracted, the process proceeds to the step S407. If the number of the extracted feature points is determined to be less than the predetermined number, the process proceeds to the step S406.

In the step S406, the inspection apparatus 109 stores the sheet vertices as alignment information into the memory 239.

In the step S407, the inspection apparatus 109 stores the feature points extracted in the step S404 as alignment information into the memory 239.

In the step S408, for example, the inspection apparatus 109 displays a screen illustrated in FIG. 7 on the display unit 241 of the inspection apparatus 109 to notify the user that the reference image having been registered is an image having a few feature points. The display on the display unit is controlled by the CPU 238 of the inspection apparatus 109.

A user interface (UI) 700 illustrated in FIG. 7 is a UI for letting the user know that the reference image having been registered is an image having a few feature points and confirming whether to go ahead to execute an inspection or to return to the step of registering a reference image without executing an inspection.

A button 701 is a button for going back to the step S401 in order to redo reference image registration.

A button 702 is a button for performing inspection setting processing in order to make inspection settings.

A button 703 is a button for making the UI 700 disappear.

The inspection apparatus 109 keeps the UI 700 displayed until the button 701, the button 702, or the close button 703 is selected in accordance with user operation.

In the step S409, the inspection apparatus 109 determines whether either the button 701 or the button 702 is selected in accordance with user operation. If the button 701 is selected, the process returns to the step S401 to read a reference image again.

If the button 702 is selected, the process proceeds to the step S410 to set an inspection mode for a case where an image having a few feature points has been registered.

Figure 8:
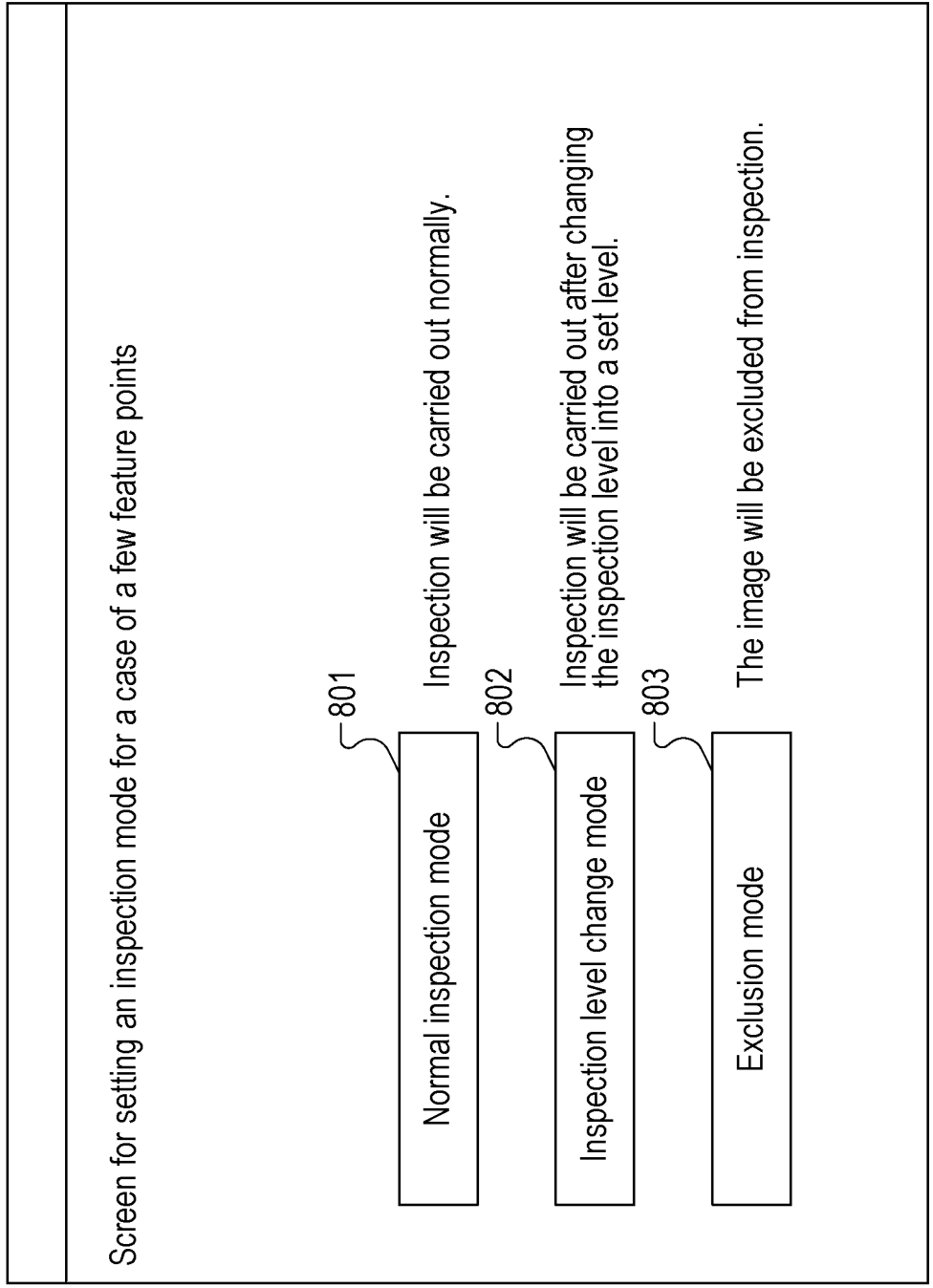
FIG. 8 is a diagram illustrating an example of a UI screen for making settings for an image having a few feature points.

In the step S410, for example, the inspection apparatus 109 displays a screen illustrated in FIG. 8 on the display unit 241 of the inspection apparatus 109 for the user to make settings about operation for a case where an image having a few feature points has been registered.

A UI 800 illustrated in FIG. 8 is a UI screen for setting an inspection mode for a case where the image has a few feature points.

A button 801 is a button for executing an inspection in a normal inspection mode in a case where the image has a few feature points. In the normal inspection mode, alignment is performed based on information on the sheet vertices of the reference image and information on the sheet vertices of the scan image. As for the level of the inspection, in the normal inspection mode, the inspection is executed under the same settings as in a case where the number of the feature points is sufficient.

A button 802 is a button for executing an inspection in an inspection level change mode in a case where the image has a few feature points. The inspection level change mode is an inspection mode in which an inspection is executed with automatic changes in the level of the inspection made to inspection settings that have been configured. In the inspection level change mode, alignment is performed based on information on the sheet vertices of the reference image and information on the sheet vertices of the scan image. As for the level of the inspection, in the inspection level change mode, the inspection is executed at an automatically-changed predetermined level.

A button 803 is a button for executing an inspection in an exclusion mode in a case where the image has a few feature points. The exclusion mode is a mode to exclude a registered inspection image from inspection.

In the step S411, the inspection apparatus 109 sets detailed information such as the inspection level of a print image inspection, the type of the inspection, and the area of the inspection in accordance with user operation. A detailed explanation of this step will be given later.

In the step S412, in response to a print job for inspection commanded from the client PC 103, the inspection apparatus 109 detects the conveyance of a sheet, scans the sheet by the image capturing unit 240, and stores the scan image into the memory 239 of the inspection apparatus 109. Then, the inspection apparatus 109 compares the scan image obtained by the scanning of the inspection job with the reference image registered in the step 401 to carry out the inspection thereof while using the inspection parameters set in the steps S410 and 411. A detailed explanation of this step will be given later.

Detailed Explanation of Method for Calculation of Feature Point Information

Figure 5A:
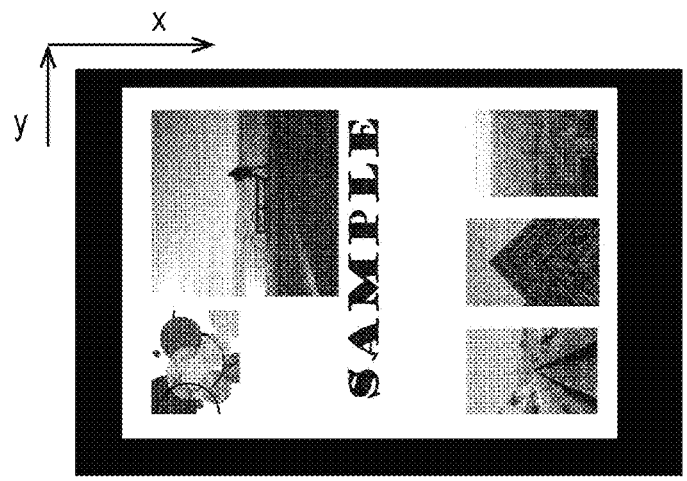
FIG. 5A is a diagram illustrating an example of a captured image.
Figure 5B:
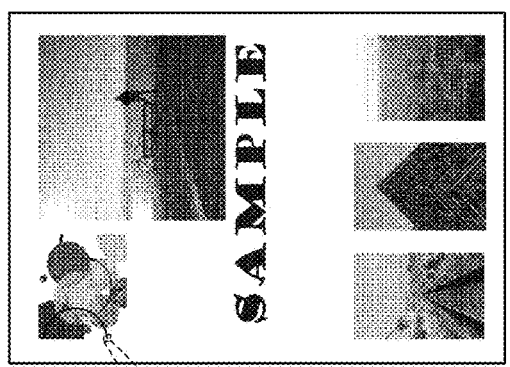
FIG. 5B is a diagram illustrating an example of an image after image shape transformation performed on the captured image.
Figure 5C:
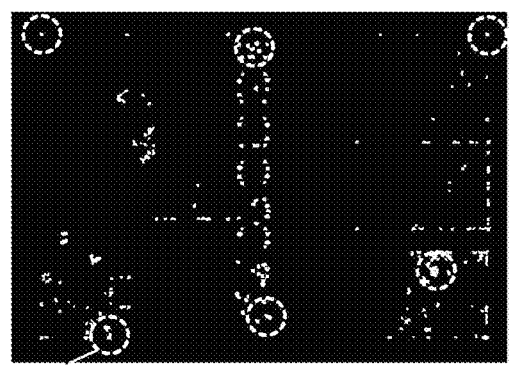
FIG. 5C is an example of a diagram illustrating extracted feature points.

With reference to FIGS. 5A, 5B, and 5C, a detailed explanation of a method for calculation of feature point information will be given below.

FIGS. 5A, 5B, and 5C are diagrams for explaining the extraction of feature points in the step S404.

FIG. 5A illustrates the image captured by the image capturing unit 240. FIG. 5B illustrates an image after image shape transformation performed using sheet vertices. As explained earlier in the step S404, as feature points suited for alignment of the image as a whole, points whose corner feature amount in the image is large are conceivable.

Various methods have been devised for detecting a corner feature amount that is an amount indicating the strength of an edge feature; as one of methods for calculating a corner feature amount, there exists a known technique called as Harris corner detection. In the Harris corner detection method, a corner feature amount image is calculated from a derivative image in the main-scanning direction and a derivative image in the sub-scanning direction. The corner feature amount image is an image representing an edge amount of the weaker one of two edges constituting a corner feature. The amount of a corner feature is expressed based on whether the weaker one of two edges constituting the corner feature, both of which are supposed to be strong, has a large edge amount or not. FIG. 5C illustrates that pixels whose feature amount is greater than a predetermined value are expressed in white by applying the Harris corner detection method to the image illustrated in FIG. 5B. There exist a plurality of points where the corner feature amount is comparatively large within the image; in the present embodiment, among them, six points whose corner feature amount ranks in a high level and whose positions are scattered within the entire area of the image are extracted as feature points to be used for alignment. In FIG. 5C, the positions of the extracted six points are indicated by white dotted-line circles.

Figure 5D:
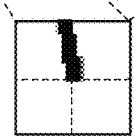
FIG. 5D is an example of an enlarged view of a certain feature point.

FIG. 5D illustrates an image of an area of 33 pixels square corresponding to one of the six feature points extracted in FIG. 5C. In the flow of inspection processing to be described later, search processing is performed on the read image to be inspected to find a location of a match with the image illustrated in FIG. 5D in the neighborhood of the coordinates corresponding to the feature point; by this means, it is possible to acquire the coordinates of the feature point in the read image to be inspected.

Examples of Case Where Image has a Few Feature Points

A case where the number of feature points is not less than a predetermined number and where extracted feature points are located in a well-distributed manner has been described with reference to FIGS. 5A, 5B, and 5C. Next, with reference to FIGS. 6A and 6B, a case where an image has a few feature points and where feature points are located in an unbalanced manner will now be explained. This applies to a case where, for example, a reference image is registered using a blank sheet with no print image thereon or using a sheet having a print pattern including only points whose corner feature amount is small. From a read image obtained by scanning such a sheet, there is a possibility that a sufficient number of feature points for image-to-image alignment might not be able to be extracted.

Figure 6A:
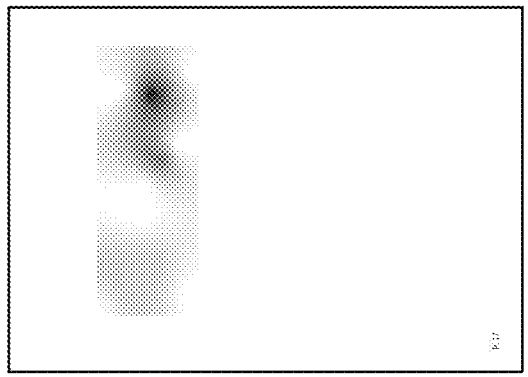
FIG. 6A is a diagram illustrating an example of an image having a few feature points.
Figure 6B:
FIG. 6B is a diagram illustrating an example of a feature point extracted from the image having a few feature points.

FIG. 6B illustrates an example of an image with a feature point extracted in the step S404 from a reference image illustrated in FIG. 6A. In the image illustrated in FIG. 6B, points whose feature amount is large are located in an unbalanced manner at one corner area (indicated by a dotted-line circle in the figure) of a sheet. When the CPU 238 extracts any one of these points whose feature amount is large as a feature point, the others of these points will not be extracted as feature points because they are very close to the extracted one. In this case, even with feature point extraction from the reference image, it could be difficult to align the target read image to be processed with the reference image by feature-point-based alignment.

Detailed Settings of Inspection Method

Figure 9:
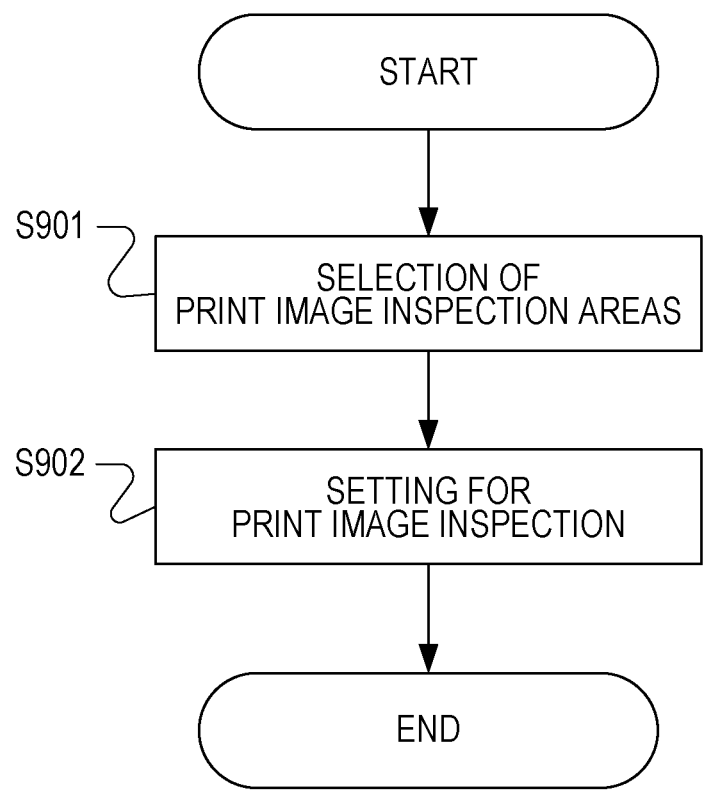
FIG. 9 is an example of a flowchart of detailed settings of a method of inspection.

Next, with reference to the flowchart of FIG. 9, processing for setting detailed information such as the inspection level of a print image inspection, the type of the inspection, and the area of the inspection in the step S411 will now be explained. Steps S901 and S902 in the flowchart are implemented by reading and running a program stored in the HDD 255 by the CPU 238.

Figure 10:
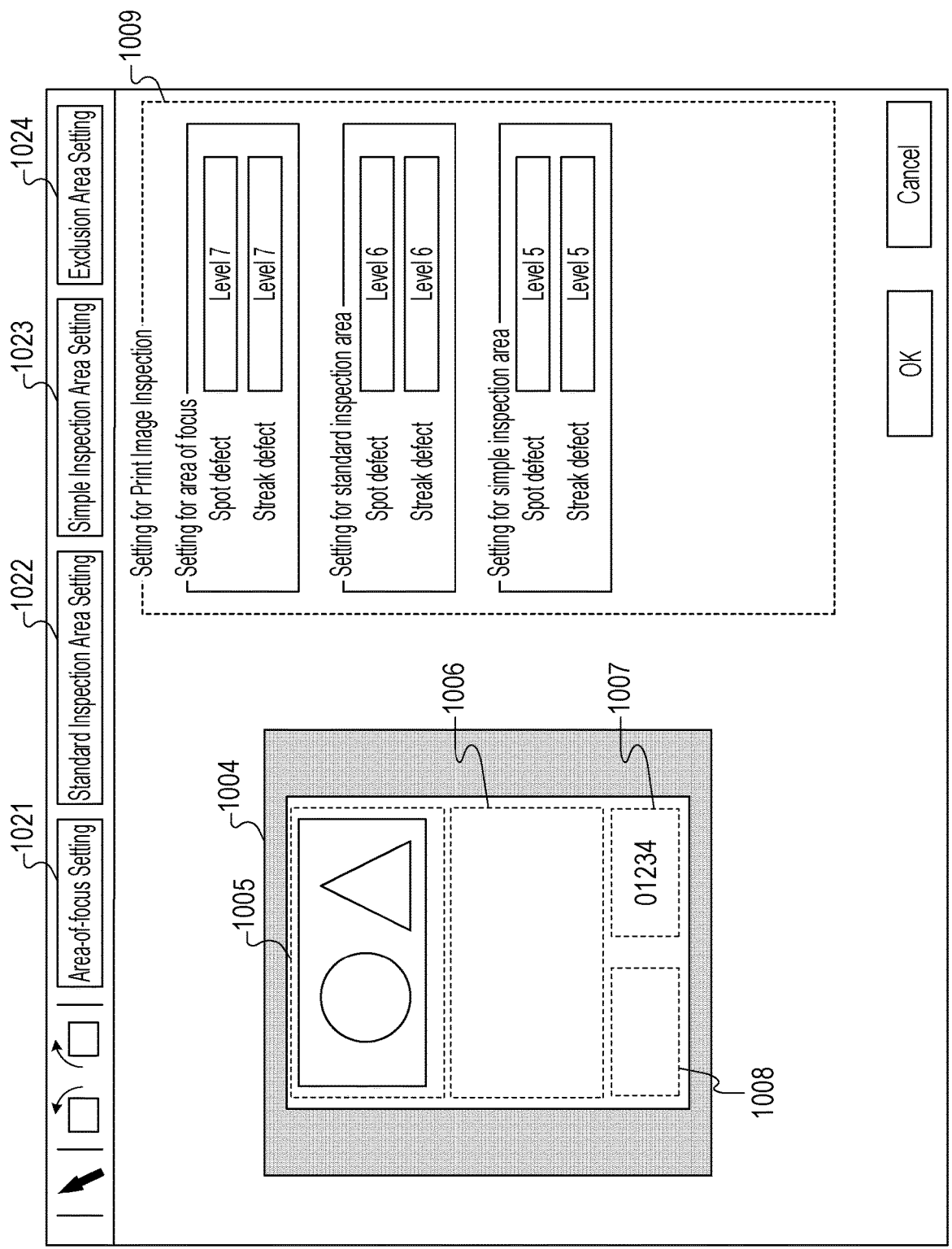
FIG. 10 is a diagram illustrating an example of a UI screen for making inspection settings.

By performing processing in this flowchart, the inspection apparatus 109 sets various inspection parameters such as the inspection area of a print image inspection, the inspection level thereof, etc. With reference to FIG. 10, an example of UI regarding inspection settings will now be explained.

In the step S901, the inspection apparatus 109 sets print image inspection areas. The method of setting print image inspection areas according to the present embodiment is as follows.

In the present embodiment, four kinds of area setting are performed. Specifically, the four kinds of area setting are: setting an area of focus, setting a standard inspection area, setting a simple inspection area, and setting an out-of-the-scope-of-inspection area (exclusion area outside the scope). The area of focus is an area where a defect inspection should be executed more rigorously with greater importance in comparison with other areas. An example of the area of focus is a human face area. The standard inspection area is an area that should be inspected with a standard degree of rigorousness. The simple inspection area is an area for which a simpler inspection than at the standard inspection area suffices. The out-of-the-scope-of-inspection area is an area to be excluded from the scope of inspection.

First, to set an area of focus, the user presses a button 1021 labeled "Area-of-focus Setting". Next, the user designates a regional range which the user wants to be inspected more rigorously in a page preview 1004. The inspection apparatus 109 sets the designated regional range as an area of focus 1005.

To set a standard inspection area, the user presses a button 1022 labeled "Standard Inspection Area Setting". Next, the user designates a regional range which the user wants to be inspected with a standard degree of rigorousness in the page preview 1004. The inspection apparatus 109 sets the designated regional range as a standard inspection area 1007.

To set a simple inspection area, the user presses a button 1023 labeled "Simple Inspection Area Setting". Next, the user designates a regional range which the user wants to be inspected simply in the page preview 1004. The inspection apparatus 109 sets the designated regional range as a simple inspection area 1006.

To set an out-of-the-scope-of-inspection area, the user presses a button 1024 labeled "Exclusion Area Setting". Next, the user designates a regional range which the user wants to be excluded from the scope of inspection in the page preview 1004. The inspection apparatus 109 sets the designated regional range as an out-of-the-scope-of-inspection area 1008.

In the step S902, the inspection apparatus 109 sets detection items for which defect detection should be performed in the print image inspection, and the inspection level thereof, on a UI screen 1009.

The "detection item" in the print image inspection means an item regarding the characteristics of a defect which the user wants to be detected when a printed material is inspected. For example, the detection item is a defect having a round shape (a spot), a streaky defect (a streak), etc. In the present embodiment, a recording sheet with an image printed thereon will be referred to as "printed material". The inspection level is a parameter set on a scale basis for specifying a threshold degree for determination as being defective for each characteristic of a detected defect. For example, the inspection level is set on a 7-point scale of "Level 1" to "Level 7". Setting the inspection level to "Level 7" makes it possible to detect a fainter and finer defect than "Level 1. The level setting can be made for each inspection item, for example, "Level 7" for spot inspection and "Level 4" for streak inspection. The scale of the parameter, and the level thereof, are not limited to this example. The illustrated example of the UI screen 1009 shows that "Level 7" has been selected as the inspection level for a spot defect by the user, and "Level 7" for a streak defect. FIG. 14A illustrates an example of inspection level coordinate information having been set in the step S411. The coordinates of the upper left corner of the area designated in the page preview 1004 are stored as a start coordinate. The coordinates of the lower right corner of the area designated in the page preview 1004 are stored as an end coordinate.

The foregoing is an explanation of processing regarding detailed settings made in the step S411 for the inspection level of a print image inspection, the type of the inspection, and the area of the inspection.

Detailed Explanation of Inspection Processing

Next, with reference to the flowcharts of FIGS. 11 and 12, the flow of inspection processing performed by the inspection apparatus 109 in the step S412 will now be explained. Steps S1101 to S1110 in the flowchart are implemented by reading and running a program stored in the HDD 255 by the CPU 238.

Figure 11:
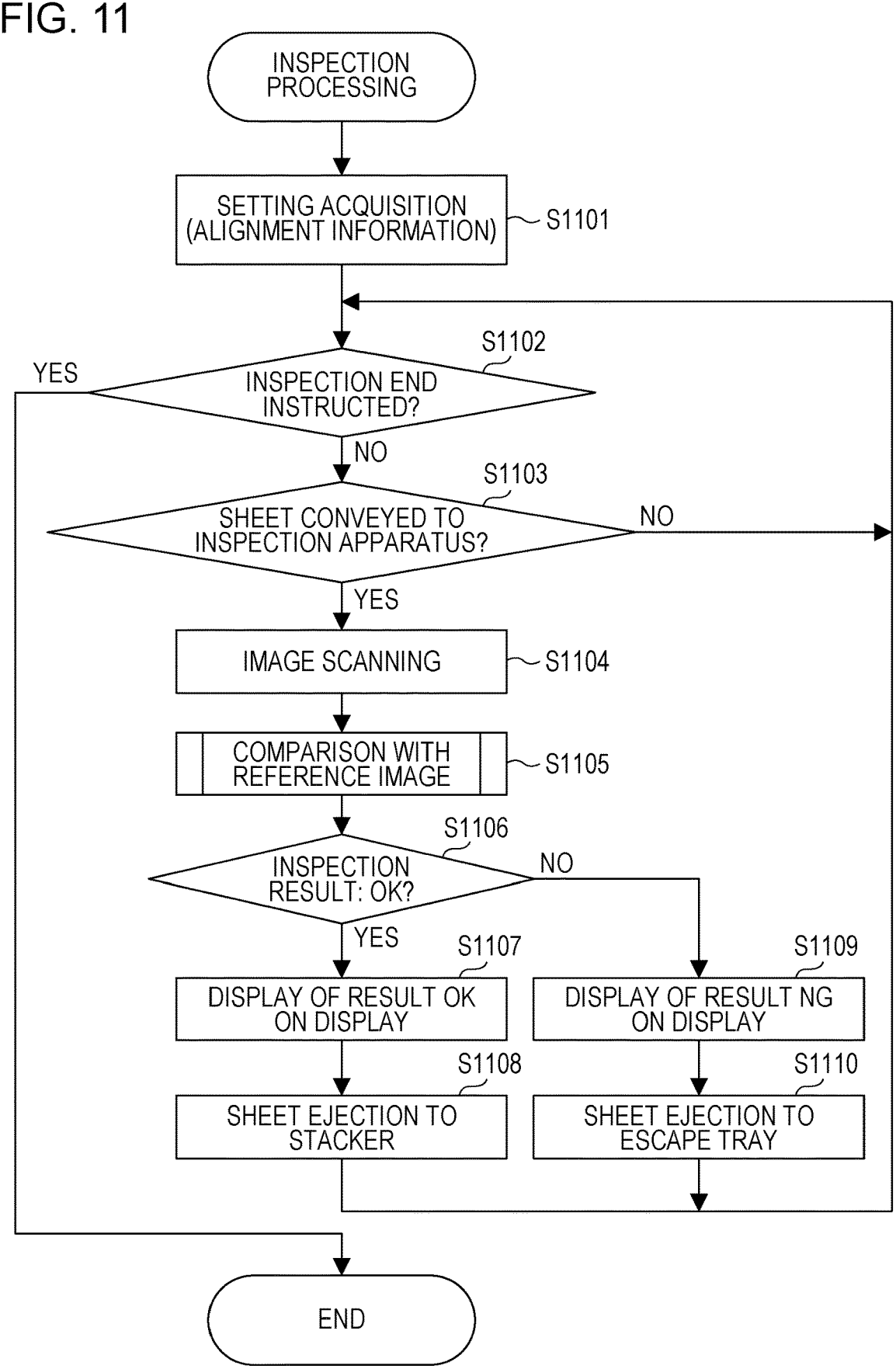
FIG. 11 is an example of a processing flowchart for an inspection apparatus configured to perform inspection processing.

FIG. 11 is a flowchart illustrating the flow of processing performed by the inspection apparatus 109 when carrying out inspection. The processing illustrated in FIG. 11 is performed by the CPU 238 of the inspection apparatus 109.

In the step S1101, the inspection apparatus 109 acquires print settings and alignment information.

In the step S1102, the inspection apparatus 109 determines whether an inspection end instruction is received or not. The inspection processing is ended if an inspection end instruction is received. The process proceeds to the step S1103 if an inspection end instruction is not received.

In the step S1103, the inspection apparatus 109 determines whether a sheet is conveyed to the inspection apparatus 109 or not. The process returns to the step S1102 if there is no sheet conveyed thereto. The process proceeds to the step S1104 if a sheet is conveyed thereto. An image of the sheet is scanned using the CIS s 331 and 332. The scanned image is stored into the memory 239 of the inspection apparatus 109.

In the step S1105, the inspection apparatus 109 compares the image having been scanned in the step S1104 with the reference image. The reference image used here is the image generated through the flow of FIG. 4. A flow as to how to compare the scan image with the reference image will be described later using FIG. 12.

Next, the process proceeds to the step S1106. Based on the result of comparison with the reference image in the step S1105, the inspection apparatus 109 determines whether the image that is being inspected is a non-defective image or a defective image.

If it is determined in the step S1106 that the image that is being inspected is a non-defective image (inspection OK), the process proceeds to the step S1107, and the inspection result "OK" is displayed on the display unit 241 of the inspection apparatus 109.

Next, the process proceeds to the step S1108. The inspection apparatus 109 instructs the printing apparatus 107 that the printed sheet should be ejected to the stack tray 341 of the large-capacity stacker 110. Based on the instruction from the inspection apparatus 109, the printing apparatus 107 causes the large-capacity stacker 110 to eject the printed sheet to the stack tray 341.

Next, the process returns to the step S1102 to continue the processing.

If it is determined in the step S1106 that the image that is being inspected is a defective image (not OK), the process proceeds to the step S1109, and the inspection result "Failed" is displayed on the display unit 241 of the inspection apparatus 109.

Next, the process proceeds to the step S1110. The inspection apparatus 109 instructs the printing apparatus 107 that the printed sheet should be ejected to the escape tray 346 of the large-capacity stacker 110. Based on the instruction from the inspection apparatus 109, the printing apparatus 107 causes the large-capacity stacker 110 to eject the printed sheet to the escape tray 346.

Next, the process returns to the step S1102 to continue the processing. If an inspection end instruction is received or if an inspection end instruction has been received before the next sheet is conveyed, the inspection processing is ended.

Detailed Explanation of Processing for Comparison with Reference Image

Figure 12:
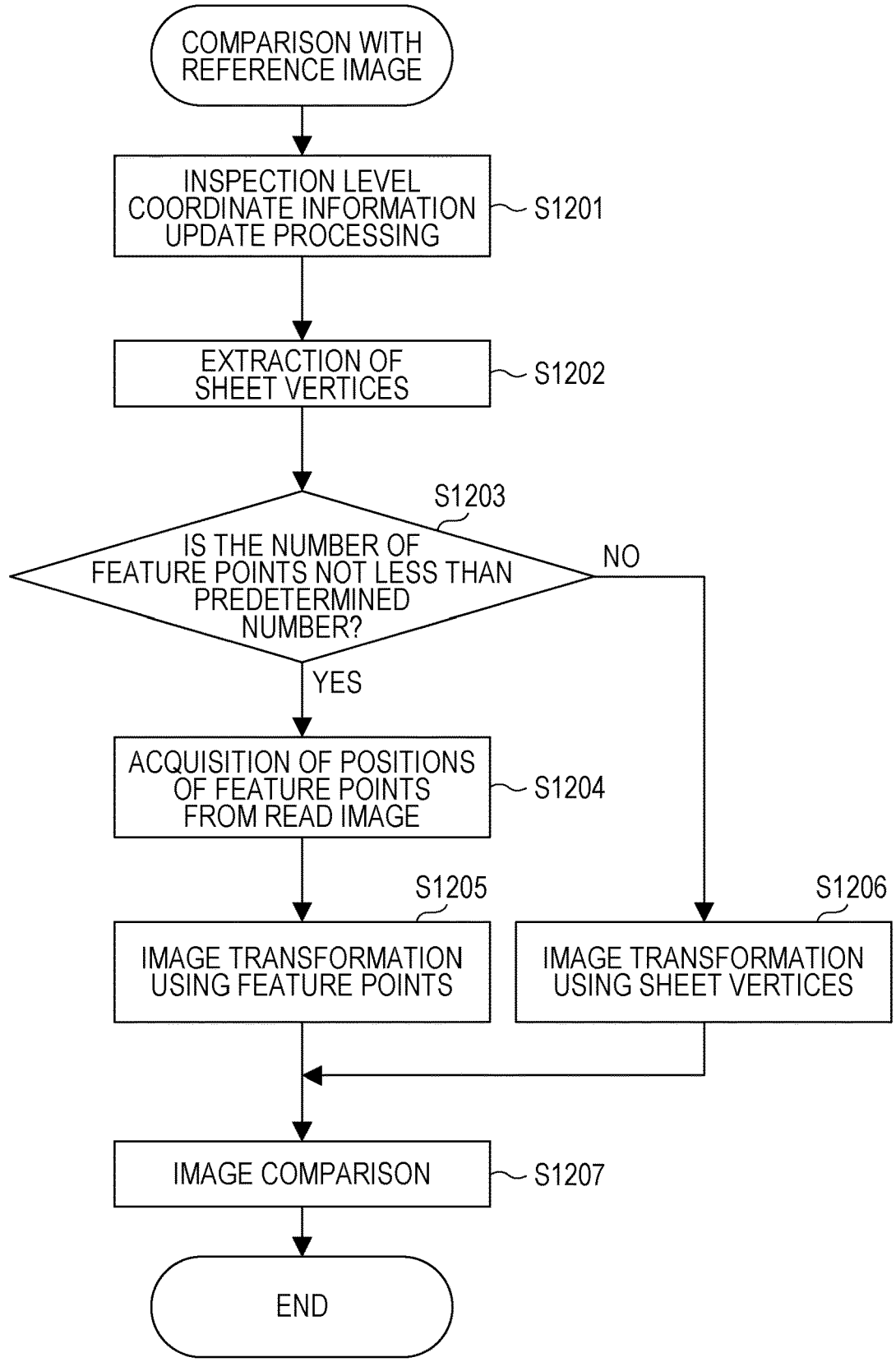
FIG. 12 is an example of a processing flowchart for the inspection apparatus configured to perform comparison with a reference image.

FIG. 12 is a flowchart illustrating the flow of processing performed by the inspection apparatus 109 when making a comparison with the reference image in the inspection processing. Steps S1201 to S1207 in the flowchart are implemented by reading and running a program stored in the HDD 255 by the CPU 238.

In the step S1201, the inspection apparatus 109 performs processing for updating the inspection level and the coordinate information. A detailed explanation of this step will be given later.

In the step S1202, the inspection apparatus 109 extracts the positions of sheet vertices from the image captured by the image capturing unit 240.

In the step S1203, the inspection apparatus 109 determines whether or not the number of the feature points in the reference image, which has been calculated in the step S404, is not less than the predetermined number. The process proceeds to the step S1204 if it is determined that the number of the feature points is not less than the predetermined number.

If the number of the feature points is less than the predetermined number, the process proceeds to the step S1206.

In the step S1204, the inspection apparatus 109 performs search processing on the image having been read in the step S1104 to find a location of a match, with the image at the position of each feature point in the reference image, in the neighborhood of the coordinates corresponding to the feature point from the sheet vertex position, thereby acquiring the positions of the feature points in the read image.

In the step S1205, the inspection apparatus 109 transforms the shape of the read image and performs alignment such that the positions of the feature points in the read image, which have been acquired in the step S1204, will coincide with the positions of the feature points in the reference image. This process may include processing of converting the resolution of the captured image into predetermined resolution. Such image shape transformation is also called as geometric transform. Known methods such as affine transformation, etc. exist. In affine transformation, a coefficient that is needed for affine transformation processing can be obtained based on the coordinates of locations where a match between a base image (herein, the reference image) and a scan image to be transformed in shape (herein, the read image) is wanted.

In the step S1206, the inspection apparatus 109 transforms the shape of the read image and performs alignment such that the positions of the sheet vertices having been acquired in the step S1202 will coincide with the positions of the sheet vertices of the reference image. This process may include processing of converting the resolution of the captured image into predetermined resolution.

In the alignment in the step S1206, both of the positions of the feature points the number of which is less than the predetermined number and the positions of the sheet vertices may be used for alignment processing.

In the step S1207, the inspection apparatus 109 compares the image having been transformed in shape in the step S1205 or S1206 with the reference image, and then terminates the flow.

For example, if the difference between the pixel value (luminance value) of the inspection target pixel in the image having been transformed in shape in the step S1205 or S1206 and the pixel value (luminance value) of the comparison target pixel in the reference image is not greater than a threshold value, the inspection apparatus 109 determines the inspection target pixel as "Passed". The threshold value differs from one inspection level to another, for example, as follows. The threshold level for "Level 1" inspection is 200. The threshold level for "Level 2" inspection is 180. The threshold level for "Level 3" inspection is 150. The threshold level for "Level 4" inspection is 130. The threshold level for "Level 5" inspection is 120. The threshold level for "Level 6" inspection is 100. The threshold level for "Level 7" inspection is 50.

Then, upon finishing the inspection of all of the pixels constituting the image having been transformed in shape in the step S1205 or S1206, the inspection apparatus 109 determines whether or not the total number of pixels having been determined as "Failed" is not greater than a pass threshold value. If the total number of the pixels having been determined as "Failed" is not greater than the pass threshold value, the inspection apparatus 109 determines the image having been transformed in shape in the step S1205 or S1206 as "Passed". If the total number of the pixels having been determined as "Failed" is greater than the pass threshold value, the inspection apparatus 109 determines the image having been transformed in shape in the step S1205 or S1206 as "Failed".

In the present embodiment, the determination in the step S1203 is performed based on the number of the feature points in the reference image. However, the determination in the step S1203 may be performed based on the number of the feature points in the scan image.

Detailed Explanation of Processing for Updating Inspection Level and Coordinate Information Next, with reference to the flowchart of FIG. 13 in conjunction with FIG. 14, the flow of processing performed by the inspection apparatus 109 in the step S1201 for updating the inspection level and the coordinate information will now be explained. Steps S1301 to S1305 in the flowchart are implemented by reading and running a program stored in the HDD 255 by the CPU 238.

Figure 13:
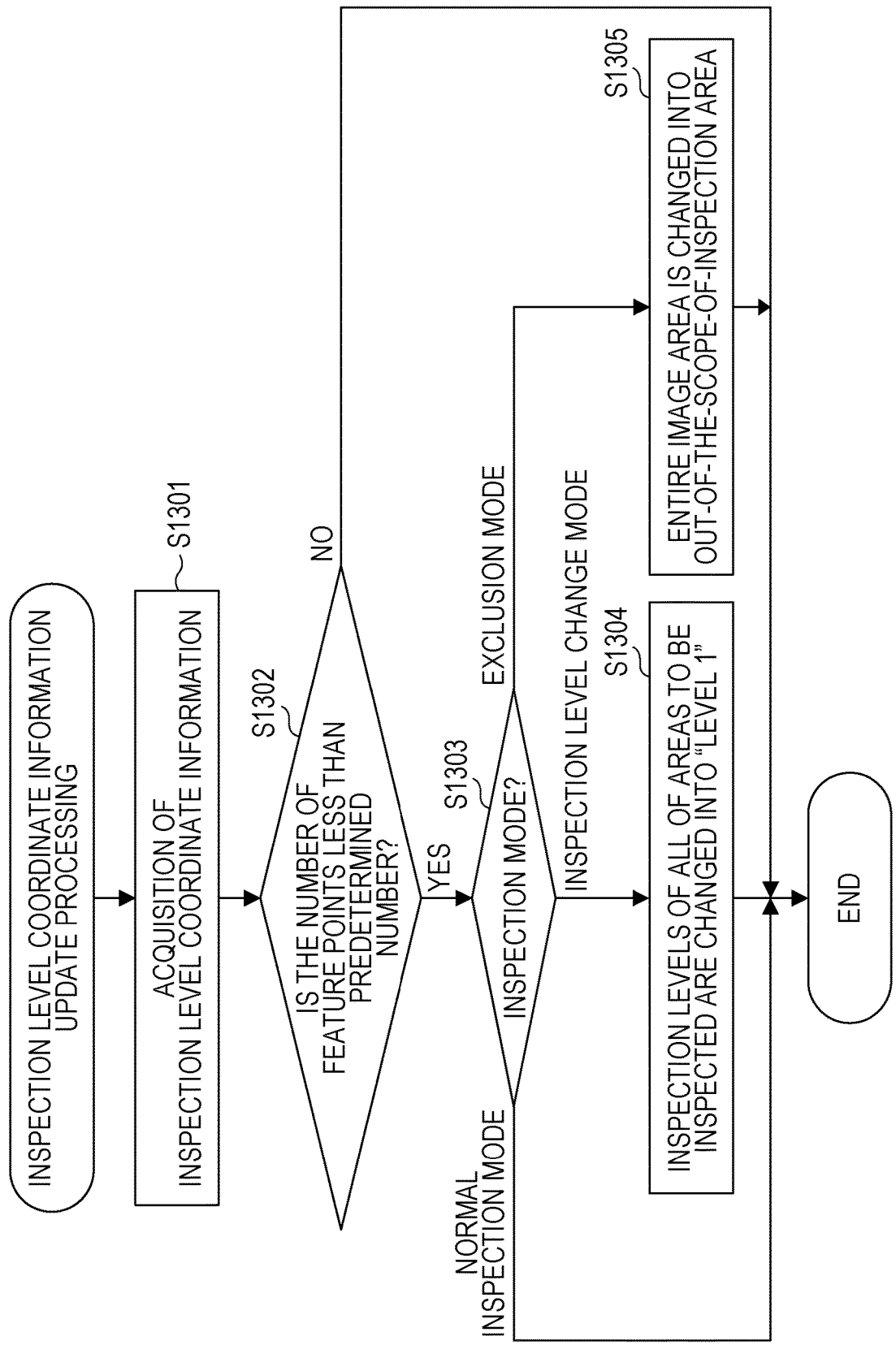
FIG. 13 is an example of a processing flowchart of inspection level coordinate information update processing.

FIG. 13 is a flowchart illustrating the flow of processing performed by the inspection apparatus 109 when performing processing for updating the inspection level and the coordinate information. FIGS. 14A, 14B, and 14C are diagrams for explaining the processing for updating the inspection level and the coordinate information.

In the step S1301, the inspection apparatus 109 acquires the inspection level coordinate information having been set in the step S411.

In the step S1302, in order to determine whether the inspection level and the coordinate information need to be updated or not, the inspection apparatus 109 determines whether or not the number of feature points in the reference image is not less than a predetermined number. It is assumed here that the processing in the step S1302 is performed by storing the information having been acquired in the step S404 and performing determination based on the stored information. However, the determination may be performed based on information obtained by performing feature point extraction from the reference image again in the step S1302.

If the number of the feature points is not less than the predetermined number, updating the inspection level coordinate information is determined to be unnecessary. In this case, the inspection level coordinate information is not updated, and the processing for updating the inspection level and the coordinate information is terminated.

If the number of the feature points is less than the predetermined number, the inspection level coordinate information is updated so that operation will be performed in the inspection mode having been set in the step S410 for a case where the image has a few feature points. If the number of the feature points is less than the predetermined number, the process proceeds to the step S1303.

In the step S1303, in order to operate in the inspection mode having been selected in the step S410, the inspection apparatus 109 identifies the selected inspection mode. If it is determined that the normal inspection mode has been selected, the processing for updating the inspection level and the coordinate information is terminated without updating the inspection level coordinate information.

If it is determined that the inspection level change mode has been selected, the process proceeds to the step S1304, and the inspection level coordinate information is updated. If it is determined that the exclusion mode has been selected, the process proceeds to the step S1305, and the inspection level coordinate information is updated.

In the step S1304, the inspection apparatus 109 changes the inspection levels of all of the areas to be inspected (the area of focus, the standard inspection area, and the simple inspection area) to "Level 1". Changing the inspection levels to "Level 1" makes it possible to reduce the occurrence of erroneous determination even in a case of low alignment precision due to the image having a few feature points.

FIG. 14A illustrates an example of the inspection level coordinate information before being updated. Since the inspection levels of all of the areas to be inspected (the area of focus, the standard inspection area, and the simple inspection area) are changed to "Level 1" in the step S1304, the "after-the-change" inspection level of all of the areas to be inspected (the area of focus, the standard inspection area, and the simple inspection area) is "Level 1" as illustrated in FIG. 14B.

In the step S1305, the inspection apparatus 109 changes information on the out-of-the-scope-of-inspection area in the inspection level coordinate information. Designating the entire image area as the out-of-the-scope-of-inspection area makes it possible to reduce the occurrence of erroneous determination even in a case of low alignment precision due to the image having a few feature points.

FIG. 14A illustrates an example of the inspection level coordinate information before being updated. When an instruction to designate the entire image area as the out-of-the-scope-of-inspection area is given in the step S1305, as illustrated in FIG. 14C, the information on the out-of-the-scope-of-inspection area is updated. Namely, the entire image area is designated as the out-of-the-scope-of-inspection area. In the table, Xmax denotes the length of the inspection image in the horizontal direction; this length changes depending on sheet size. In the table, Ymax denotes the length of the inspection image in the vertical direction; this length also changes depending on sheet size.

The method described above will be effective when applied to a case where a fine precision error in print position will be undesirably detected as a difference if the alignment is performed based on the sheet vertices, although a fine precision error in print position will be corrected to pass the inspection if the alignment is performed based on the feature points. It is possible to switch the inspection mode between a mode for an inspection target for which a fine precision error in print position should be detected as defective printing and a mode for an inspection target for which a fine precision error in print position should be tolerated.

Though a case where the number of the feature points is less than the predetermined number has been described above, it may be determined that the extracted feature points are not enough for image-to-image alignment also in cases where, though the number of the feature points is not less than the predetermined number, the feature points are arranged in a row or concentrated at one place, etc.

In the foregoing embodiment, a method of switching the inspection mode for a case where the image has a few feature points has been described. However, there is an issue that it is difficult to suppress erroneous determination if the normal inspection mode is selected.

To address this issue, described as another embodiment below is a method of imposing a limitation on a range of the levels of inspection settable in detailed settings of the method of inspection in a case where an image having a few feature points has been registered as the reference image. By limiting the range of the setting such that high inspection levels cannot be selected, it is possible to reduce the occurrence of erroneous determination even in a case of low alignment precision.

Only the differences from the foregoing embodiment will be described in detail below.

Detailed Settings of Inspection Method

Figure 15:
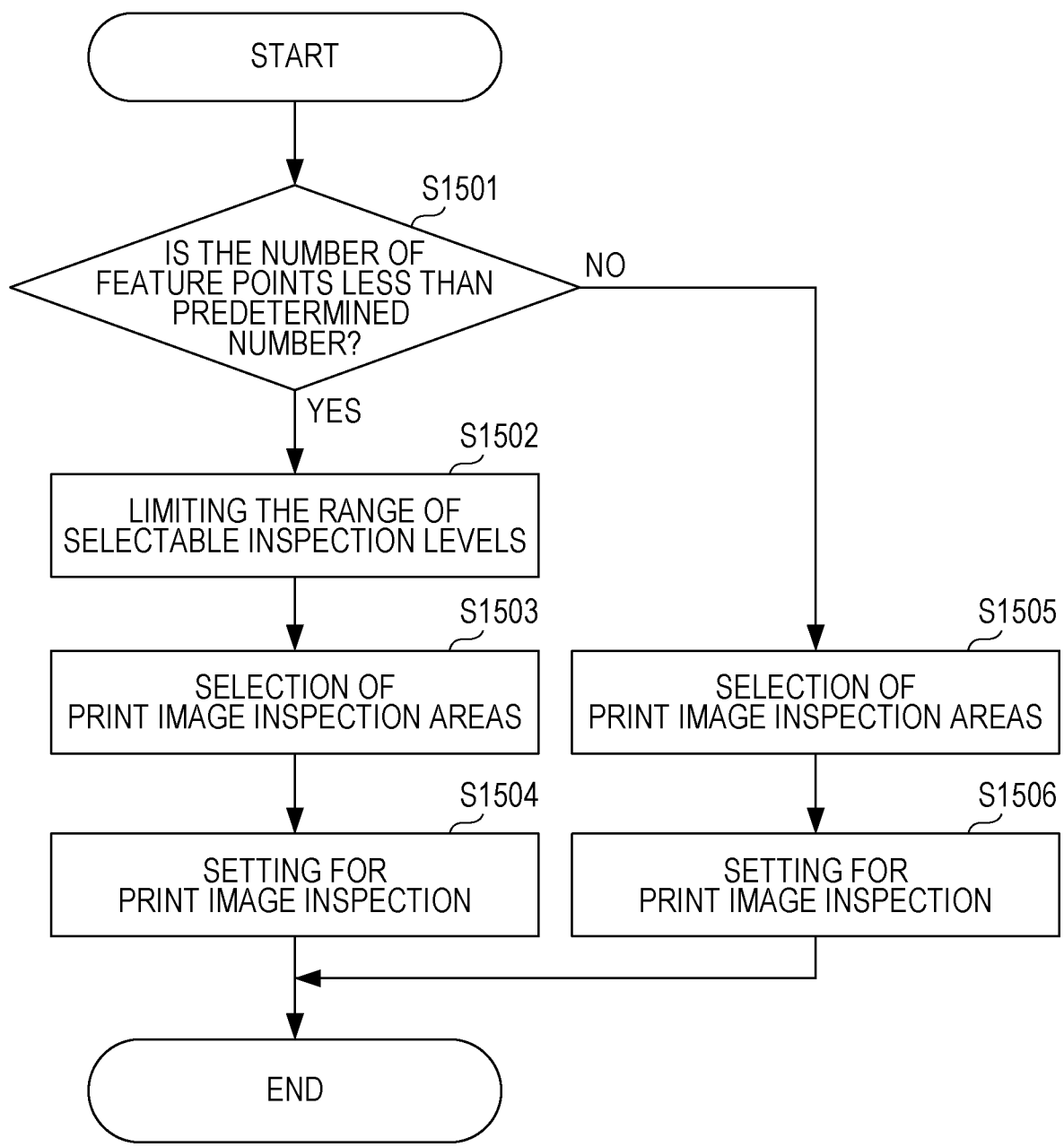
FIG. 15 is an example of a flowchart of detailed settings of a method of inspection according to another embodiment.

With reference to the flowchart of FIG. 15, processing according to another embodiment for setting detailed information such as the inspection level of a print image inspection, the type of the inspection, and the area of the inspection in the step S411 will now be explained. Steps S1501 to S1506 in the flowchart are implemented by reading and running a program stored in the HDD 255 by the CPU 238.

Figure 16:
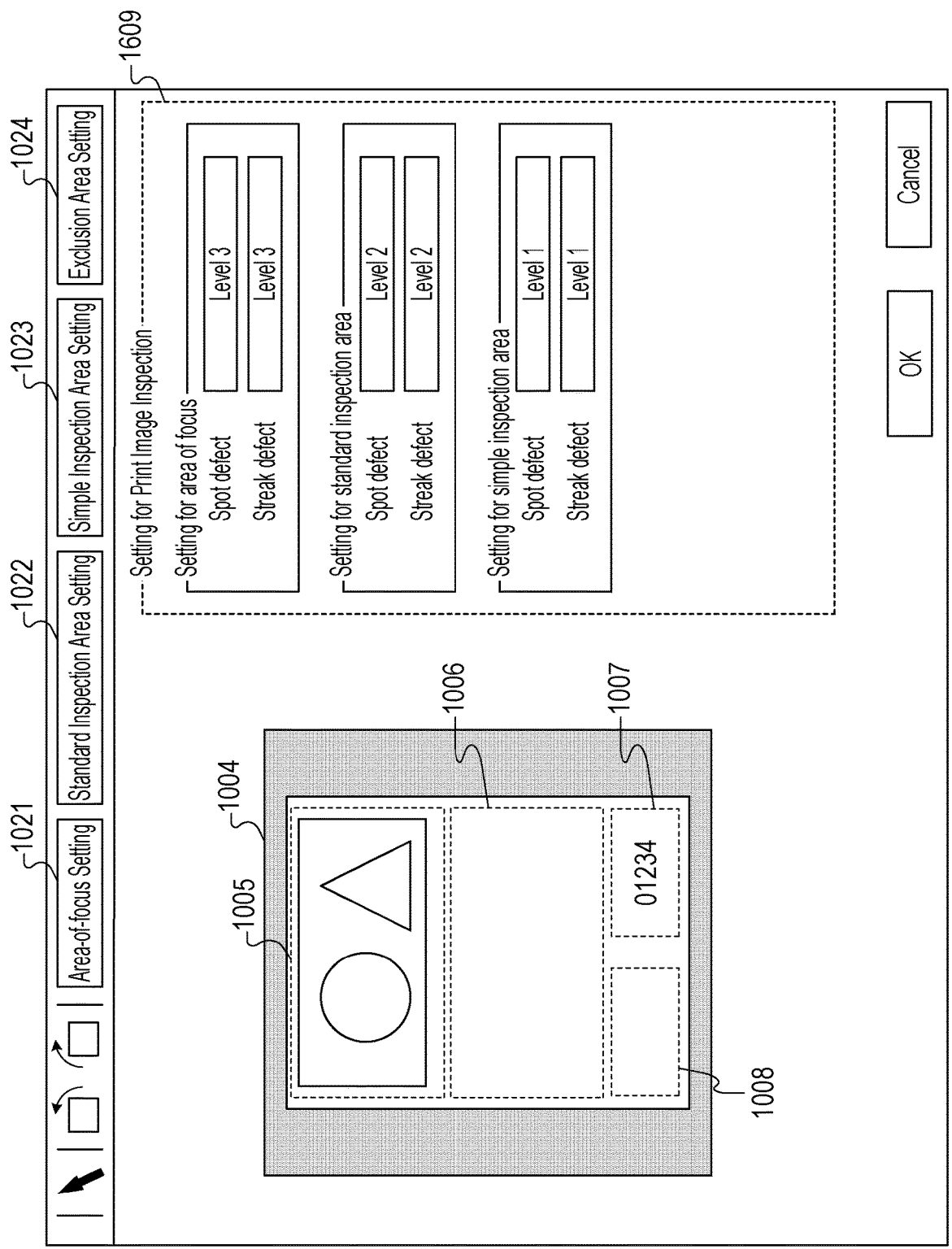
FIG. 16 is a diagram illustrating an example of a UI screen for making inspection settings according to another embodiment.

By performing processing in this flowchart, the inspection apparatus 109 sets various inspection parameters such as the inspection area of a print image inspection, the inspection level thereof, etc. With reference to FIG. 16, an example of UI regarding inspection settings will now be explained.

In the step S1501, the inspection apparatus 109 determines whether the number of the feature points in the reference image is less than the predetermined number or not. If the number of the feature points is less than the predetermined number, the process proceeds to the step S1502 in order to limit the range of selectable inspection levels. If the number of the feature points is not less than the predetermined number, the process proceeds to the step S1505 in order to set the inspection area and the inspection level without limiting the range of selectable inspection levels.

In the step S1502, the inspection apparatus 109 limits the range of selectable inspection levels. In the present embodiment, a case where selection is available from among seven levels from "Level 1" to "Level 7" before the restriction will be described.

The inspection apparatus 109 limits the range of inspection levels selectable for the area of focus to three levels from "Level 1" to "Level 3". The inspection apparatus 109 limits the range of inspection levels selectable for the standard inspection area to two levels from "Level 1" to "Level 2". The inspection apparatus 109 limits the range of inspection levels selectable for the simple inspection area to "Level 1" only.

In the step S1503, the inspection apparatus 109 sets print image inspection areas. The method of setting print image inspection areas according to the present embodiment is as follows. First, the user presses the button 1021 labeled "Area-of-focus Setting". Next, the user designates a regional range which the user wants to be inspected more rigorously in the page preview 1004. The inspection apparatus 109 sets the designated regional range as the area of focus 1005.

To set a standard inspection area, the user presses the button 1022 labeled "Standard Inspection Area Setting". Next, the user designates a regional range which the user wants to be inspected with a standard degree of rigorousness in the page preview 1004. The inspection apparatus 109 sets the designated regional range as the standard inspection area 1007.

To set a simple inspection area, the user presses the button 1023 labeled "Simple Inspection Area Setting". Next, the user designates a regional range which the user wants to be inspected simply in the page preview 1004. The inspection apparatus 109 sets the designated regional range as the simple inspection area 1006.

To set an out-of-the-scope-of-inspection area, the user presses a button 1024 labeled "Exclusion Area Setting". Next, the user designates a regional range which the user wants to be excluded from the scope of inspection in the page preview 1004. The inspection apparatus 109 sets the designated regional range as the out-of-the-scope-of-inspection area 1008.

In the step S1504, the inspection apparatus 109 sets detection items for which defect detection should be performed in the print image inspection, and the inspection level thereof, on a UI screen 1609.

The illustrated example of the UI screen 1609 shows that "Level 3" has been selected as the inspection level for a spot defect by the user, and "Level 3" for a streak defect.

The foregoing is an explanation of processing regarding detailed settings made in the step S411 for the inspection level of a print image inspection, the type of the inspection, and the area of the inspection.

As described above, by limiting a range of the levels of inspection settable in detailed settings of the method of inspection in a case where an image having a few feature points has been registered as the reference image, it is possible to reduce the occurrence of erroneous determination even in a case of low alignment precision.

In the foregoing embodiment, a method of switching the inspection mode for a case where the image has a few feature points has been described. However, in a case where a job containing a large number of pages (for example, 1,000 pages) is to be inspected, it is impractical to make inspection settings individually for all of these pages. A job of this kind contains pages having a few feature points and pages having many feature points in a mixed manner. In such a case, it is conceivable to register inspection operation for a case where common inspection settings and an image (page) having a few feature points have been registered and to carry out the inspection, rather than forcing the user to register inspection settings individually on a page-by-page basis.

In view of the above, in the present embodiment, the following method will be described: a method of presetting an inspection mode to be applied when, in a case where a job containing a large number of pages is to be inspected, an image having a few feature points has been registered as the reference image for a part of the job. In a case where a job containing a large number of pages is to be inspected, registration for every page will be needed if the method according to the first embodiment is employed. Using the method according to the third embodiment makes it possible to, just by performing registration processing once, carry out the inspection by performing inspection operation under common inspection settings for pages having many feature points and by performing, for pages having a few feature points, pre-registered inspection operation for a case where an image having a few feature points has been registered. Pre-registering the inspection mode makes it possible to reduce the burden of making individual settings on the user.

Only the differences from the foregoing embodiment will be described in detail below.

Overall Flow of Inspection Processing

With reference to the flowchart of FIG. 17, an overall flow according to the present embodiment from tasks performed before a start of inspection at the inspection apparatus 109 to execution of the inspection will now be explained. Steps S1701 to S1711 in the flowchart are implemented by reading and running a program stored in the HDD 255 by the CPU 238.

Figure 17:
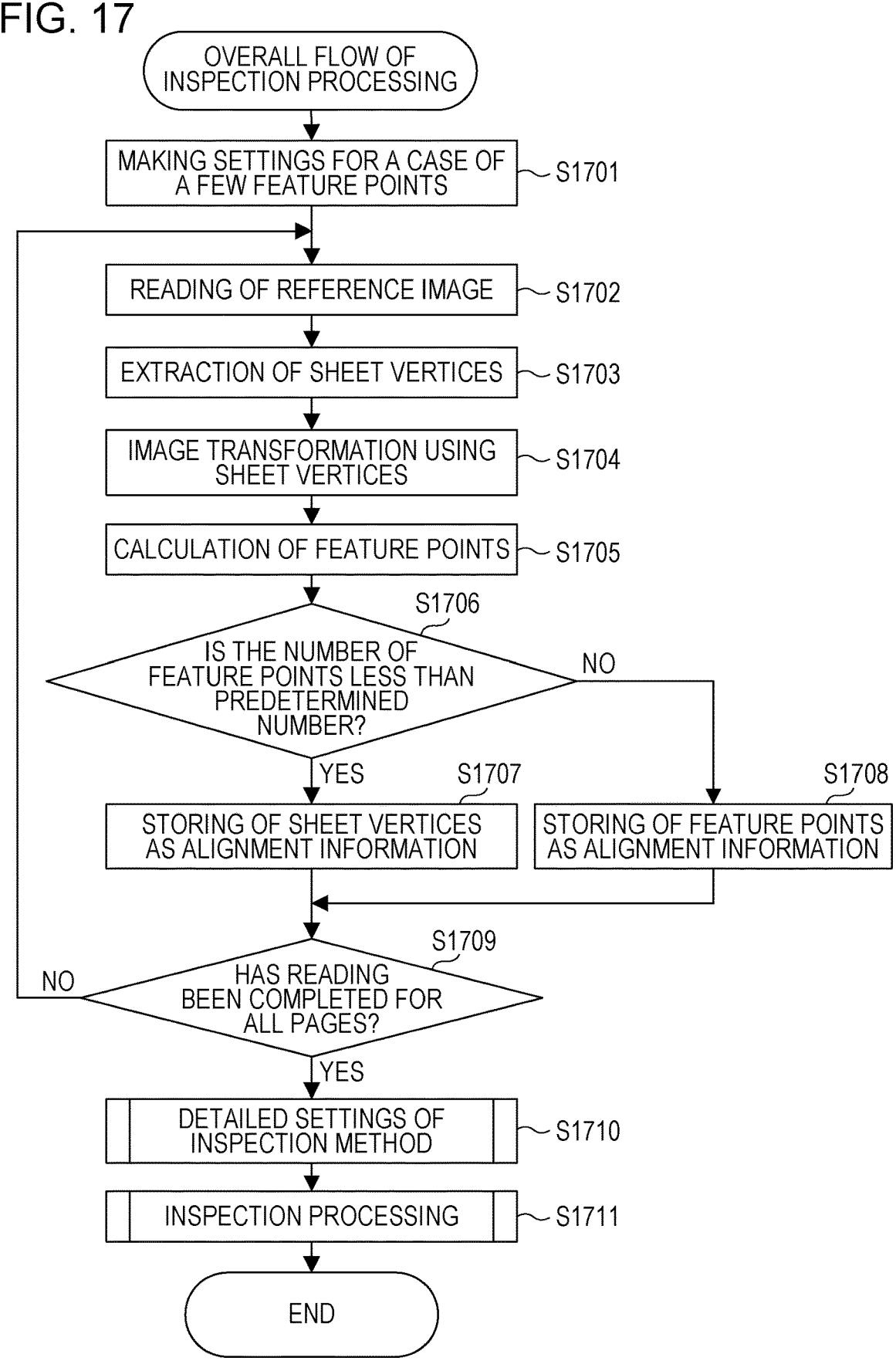
FIG. 17 is an example of a flowchart illustrating an overall flow of inspection processing according to another embodiment.

Each processing in FIG. 17 is performed by the inspection apparatus 109 in accordance with user operation via the client PC 103.

First, in the step S1701, for example, the inspection apparatus 109 displays a screen illustrated in FIG. 8 on the display unit 241 of the inspection apparatus 109 for the user to make settings about operation for a case where an image having a few feature points has been registered.

In the step S1702, the inspection apparatus 109 registers a reference image to be used as a reference for inspection OK determination.

In the step S1703, the inspection apparatus 109 extracts the positions of sheet vertices from the image captured by the image capturing unit 240. In the present embodiment, the term "sheet vertices" means the four corners of the sheet of paper.

In the step S1704, based on the positions of the sheet vertices obtained in the S1702, the inspection apparatus 109 transforms the image into the shape of the sheet.

In the step S1705, the inspection apparatus 109 calculates feature points.

In the step S1706, the inspection apparatus 109 determines whether the number of the feature points extracted by executing the step S1704 is less than a predetermined number or not. In a case where the number of the extracted feature points is determined to be not less than the predetermined number and thus where a sufficient number of feature points for image-to-image alignment has been extracted, the process proceeds to the step S1708. If the number of the extracted feature points is determined to be less than the predetermined number, the process proceeds to the step S1707.

In the step S1707, the inspection apparatus 109 stores the sheet vertices as alignment information into the memory 239.

In the step S1708, the inspection apparatus 109 stores the feature points extracted in the step S1704 as alignment information into the memory 239.

Each page of the print job is stored in association with the alignment information into the memory 239.

In the step S1709, the inspection apparatus 109 determines whether image reading for use as the reference image in the inspection has been completed for all of the pages contained in the print job or not. If the inspection apparatus 109 determines that the reading has been completed for all of the pages, the process proceeds to the step S1710 for detailed settings of the method of inspection. If the inspection apparatus 109 determines that the reading has not been completed for all of the pages yet, the process returns to the step S1702, and the image reading continues.

In the step S1710, the inspection apparatus 109 sets detailed information such as the inspection level of a print image inspection, the type of the inspection, and the area of the inspection in accordance with user operation.

In the step S1711, in response to a print job for inspection commanded from the client PC 103, the inspection apparatus 109 detects the conveyance of a sheet, scans the sheet by the image capturing unit 240, and stores the scan image into the memory 239 of the inspection apparatus 109. Then, the inspection apparatus 109 compares the scan image obtained by the scanning of the inspection job with the reference image registered in the step S1702 to carry out the inspection thereof while using the inspection parameters set in the steps S1701 and S1710.

As explained above, a method of presetting an inspection mode to be applied when, in a case where a job containing a large number of pages is to be inspected, an image having a few feature points has been registered as the reference image for a part of the job has been described. Pre-registering the inspection mode makes it possible to reduce the burden of making individual settings on the user.

Other Embodiments

While various examples and embodiments of the present disclosure have been disclosed, the spirit and scope of the present disclosure shall not be construed to be limited to any specific disclosure made herein.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-183017, filed Nov. 10, 2021, which is hereby incorporated by reference herein in its entirety.

What is claimed is:

1. An inspection system, comprising:
one or more controllers having one or more processors and one or more memories, the one or more controllers being configured to:
scan a printed material including a printed image to generate a scan image;
extract one or more feature points from each of the scan image and a reference image;
perform alignment of the scan image and the reference image, based on at least one or more corresponding pair among the feature points extracted from the scan image and from the reference image having been registered in advance;

carry out inspection of the printed material by using the reference image having been subjected to the alignment and the scan image having been subjected to the alignment; and perform processing in accordance with a method selected from among a plurality of methods including at least a first method and a second method in a case where a number of the feature points in the reference image is less than a predetermined number, wherein the processing is performed such that, in the case where the number of the feature points in the reference image is less than the predetermined number, the alignment using at least the extracted feature points is performed when the first method is selected, and the inspection is then carried out, whereas the inspection is not carried out when the second method is selected.

2. The inspection system according to claim 1, wherein, when the first method is selected, the alignment is performed by using at least some of a position of a sheet vertex of an area depicting the printed material in the scan image and a position of a sheet vertex of the reference image, and the inspection is carried out.

3. The inspection system according to claim 1, wherein the inspection is carried out based on whether or not a difference between a pixel value of a target pixel in the reference image and a pixel value of a target pixel in the scan image is not greater than a threshold value.

4. The inspection system according to claim 3, wherein, when the first method is selected, in the processing, the threshold value is set to a predetermined value.

5. The inspection system according to claim 1, wherein the one or more controllers are configured to:
set, in an image, an inspection area that is to be inspected and an exclusion area that is not to be inspected,
wherein, when the second method is selected, in the processing, an entire area depicting the printed material is set as the exclusion area, thereby not carrying out the inspection.

6. The inspection system according to claim 1, wherein the one or more controllers are configured to:
based on the number of the feature points extracted from the reference image, perform determination as to whether to use a position of the feature point for the alignment or to use a position of a sheet vertex for the alignment,
wherein, in the alignment, in accordance with the determination, the scan image is aligned with the reference image by using the position of the feature point or the position of the sheet vertex.

7. The inspection system according to claim 6, wherein, in the determination, the position of the feature point is determined to be used for the alignment in a case where the number of the feature points is not less than the predetermined number, and
wherein the processing is performed using the selected method in the case where the number of the feature points is less than the predetermined number.

8. The inspection system according to claim 1, wherein the one or more controllers are configured to:
detect an area depicting the printed material out of the scan image,
wherein the feature point in the scan image is a feature point extracted from the detected area depicting the printed material.

9. The inspection system according to claim 1, wherein the one or more controllers are configured to:
register the reference image,
wherein the reference image that is registered is the scan image generated by scanning the printed material.

10. The inspection system according to claim 1, wherein the one or more controllers are configured to:
register the reference image,
wherein the reference image that is registered is image data having been subjected to raster image processor (RIP) processing.

11. The inspection system according to claim 1, wherein the predetermined number is a minimum required number of feature points for the alignment of the scan image and the reference image.

12. The inspection system according to claim 1, wherein the one or more controllers are configured to:
perform display control on display of a screen on an operation interface,
wherein, in the display control, a screen that enables selection of any one, as the selected method, from among a plurality of modes including the first method, in which the alignment is performed by using at least a position of a sheet vertex of an area depicting the printed material in the scan image and a position of a sheet vertex of the reference image, and the second method, in which the inspection is not carried out, is displayed in the case where the number of the extracted feature points in the reference image is less than the predetermined number.

13. The inspection system according to claim 12, wherein, in the display control, an alert screen is displayed in the case where the number of the feature points in the reference image is less than the predetermined number.

14. A method for controlling an inspection system, the method comprising:
generating a scan image by scanning a printed material including a printed image;
extracting one or more feature points from each of the scan image and a reference image;
performing alignment of the scan image and the reference image based on at least some corresponding pair among the feature points extracted from the scan image and from the reference image having been registered in advance;
carrying out inspection of the printed material by using the reference image having been subjected to the alignment and the scan image having been subjected to the alignment; and
performing processing in accordance with a method selected from among a plurality of methods including at least a first method and a second method in a case where a number of the feature points in the reference image is less than a predetermined number,
wherein the processing is performed such that, in the case where the number of the feature points in the reference image is less than the predetermined number, the alignment using at least the extracted feature points is performed when the first method is selected, and the inspection is then carried out, whereas the inspection is not carried out when the second method is selected.

15. An inspection system, comprising:
one or more controllers having one or more processors and one or more memories, the one or more controllers being configured to:
scan a printed material including a printed image to generate a scan image;

extract one or more feature points from each of the scan image and a reference image;

perform alignment based on at least one or more corresponding pair among the feature points extracted from the scan image and from the reference image having been registered in advance;

carry out inspection based on whether or not a difference between a pixel value of a target pixel in the reference image having been subjected to the alignment and a pixel value of a target pixel in the scan image having been subjected to the alignment is not greater than a threshold value; and perform processing of, in a case where a number of the feature points in the reference image is less than a predetermined number, performing the alignment by using at least a position of a sheet vertex of an area depicting the printed material in the scan image and a position of a sheet vertex of the reference image, and setting the threshold value to a predetermined value.

16. The inspection system according to claim 15, wherein the one or more controllers are configured to:

based on the number of the feature points extracted from the reference image, perform determination as to whether to use a position of the feature point for the alignment or to use a position of a sheet vertex for the alignment, wherein, in the alignment, in accordance with the determination, the scan image is aligned with the reference image by using the position of the feature point or the position of the sheet vertex.

17. The inspection system according to claim 16, wherein, in the determination, the position of the feature point is determined to be used for the alignment in a case where the number of the feature points is not less than the predetermined number, and wherein, in the case where the number of the feature points is less than the predetermined number, the alignment is performed by using at least the position of the sheet vertex of the area depicting the printed material in the scan image and the position of the sheet vertex of the reference image.

18. The inspection system according to claim 15, wherein the one or more controllers are configured to:

detect the area depicting the printed material out of the scan image, wherein the feature point in the scan image is a feature point extracted from the detected area depicting the printed material.

19. A method for controlling an inspection system, the method comprising:

generating a scan image by scanning a printed material including a printed image;

extracting one or more feature points from each of the scan image and a reference image;

performing alignment based on at least one or more corresponding pair among the feature points extracted from the scan image and from the reference image having been registered in advance;

carrying out inspection based on whether or not a difference between a pixel value of a target pixel in the reference image having been subjected to the alignment and a pixel value of a target pixel in the scan image having been subjected to the alignment is not greater than a threshold value; and performing processing of, in a case where a number of the feature points in the reference image is less than a predetermined number, performing the alignment by using at least a position of a sheet vertex of an area depicting the printed material in the scan image and a position of a sheet vertex of the reference image, and setting the threshold value to a predetermined value.

* * * * *